US012085746B2

(12) United States Patent
Mitobe et al.

(10) Patent No.: US 12,085,746 B2
(45) Date of Patent: Sep. 10, 2024

(54) BACKLIGHT UNIT AND LIQUID CRYSTAL DISPLAY DEVICE

(71) Applicant: FUJIFILM Corporation, Tokyo (JP)

(72) Inventors: Fumitake Mitobe, Minamiashigara (JP); Keisuke Kodama, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 103 days.

(21) Appl. No.: 17/583,433

(22) Filed: Jan. 25, 2022

(65) Prior Publication Data

US 2022/0146742 A1 May 12, 2022

Related U.S. Application Data

(63) Continuation of application No. PCT/JP2020/028676, filed on Jul. 27, 2020.

(30) Foreign Application Priority Data

Jul. 26, 2019 (JP) ................................. 2019-138175

(51) Int. Cl.
*F21V 8/00* (2006.01)
*G02B 5/18* (2006.01)
(52) U.S. Cl.
CPC ......... *G02B 6/0055* (2013.01); *G02B 5/1833* (2013.01); *G02B 6/0025* (2013.01)
(58) Field of Classification Search
CPC ... G02B 6/0055; G02B 6/0025; G02B 5/1833
See application file for complete search history.

(56) References Cited

U.S. PATENT DOCUMENTS 6,924,870 B1 * 8/2005 Wang .................... G02B 5/1833
349/86
2011/0139234 A1 * 6/2011 Iizuka ............... H01L 31/02168
359/569

(Continued)

FOREIGN PATENT DOCUMENTS

| JP | 2006-228595 A | 8/2006 |
| JP | 2006-228596 A | 8/2006 |
| JP | 2013-175386 A | 9/2013 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/028676, dated Feb. 10, 2022, with an English translation.

(Continued)

*Primary Examiner* — Abdulmajeed Aziz
*Assistant Examiner* — Jessica M Apenteng
(74) *Attorney, Agent, or Firm* — Birch, Stewart, Kolasch & Birch, LLP

(57) ABSTRACT

Provided are a backlight unit and a liquid crystal display device including the backlight unit, the backlight unit being capable of switching between viewing angles in the liquid crystal display device and having a configuration in which the brightness values of emitted light on the "+" side and the "−" side at a polar angle with respect to the normal line are symmetric to each other. The backlight unit includes: a light guide plate; a first light source that guides light into the light guide plate from a long side or a short side of the light guide plate; a second light source that guides light into the light guide plate from a side of the light guide plate different from that of the first light source; a first diffraction element that is provided on one main surface of the light guide plate and diffracts only light emitted from one of the first light source (Continued)

or the second light source; a second diffraction element that is provided on another main surface of the light guide plate and diffracts only light emitted from another one of the first light source or the second light source; and a reflection plate that is provided on a surface of the light guide plate opposite to a light emission surface.

20 Claims, 8 Drawing Sheets

(56) References Cited

U.S. PATENT DOCUMENTS

2018/0275350 A1* 9/2018 Oh ..................... G02B 27/0172
2024/0069257 A1* 2/2024 Sasata .................. G02B 5/1833

OTHER PUBLICATIONS

International Search Report (Form PCT/ISA/210) for International Application No. PCT/JP2020/028676, dated Sep. 15, 2020, with an English translation.

* cited by examiner

BACKLIGHT UNIT AND LIQUID CRYSTAL DISPLAY DEVICE

CROSS-REFERENCE TO RELATED APPLICATIONS

This application is a Continuation of PCT International Application No. PCT/JP2020/028676 filed on Jul. 27, 2020, which claims priority under 35 U.S.C. § 119(a) to Japanese Patent Application No. 2019-138175 filed on Jul. 26, 2019. The above application is hereby expressly incorporated by reference, in its entirety, into the present application.

BACKGROUND OF THE INVENTION

1. Field of the Invention

The present invention relates to a backlight unit that can switch between levels of a viewing angle in a liquid crystal display device and a liquid crystal display device including this backlight unit.

2. Description of the Related Art

In a personal-use electronic apparatus, for example, a tablet personal computer (PC), a laptop PC, or a mobile phone such as a smartphone, a screen is desired not to be peeped by other people. Therefore, in the electronic apparatus, the viewing angle of the screen is narrowed such that the screen is prevented from being peeped.

As a method of setting the viewing angle of the screen to a narrow viewing angle, a method of bonding a black striped film (louver film) to the screen is known.

However, in this method, the viewing angle of the screen is fixed in a state where the viewing angle is narrow. Therefore, in a case where the screen needs to be visually recognized from an oblique direction, for example, in a case where the screen is visually recognized by several people, the visibility from the oblique direction deteriorates such that the usability of the electronic apparatus deteriorates.

In order to solve this inconvenience, mainly in the electronic apparatus such as a tablet PC or a laptop PC, in order to keep the security such as prevention of peeping by other people and to realize sufficient visibility from an oblique direction as necessary, various display devices that can switch between display at a wide viewing angle and display at a narrow viewing angle are disclosed.

As the display device such as a tablet PC or a laptop PC, a liquid crystal display device is used. It is disclosed that, in the liquid crystal display device, backlight emitted from a backlight unit is adjusted to switch between display at a wide viewing angle and display at a narrow viewing angle.

For example, JP2013-175386A describes a backlight unit including a diffraction element (reflective hologram layer) as the backlight unit that can switch between display at a wide viewing angle and display at a narrow viewing angle in the liquid crystal display device.

Specifically, JP2013-175386A describes a backlight unit (lighting device) including: a light guide plate; a reflective hologram layer that is provided on an upper surface or a lower surface of the light guide plate; a first light source that emits light such that the light is incident into a first side surface of the light guide plate and incident from the lower side of a lattice plane of the reflective hologram layer; a second light source that emits light such that the light is incident into a second side surface opposite to the first side surface and incident from the upper side of the lattice plane of the reflective hologram layer; a reflector that is disposed below the light guide plate; and a light amount adjustment unit that adjusts the light amounts of the first light source and the second light source independently from each other.

SUMMARY OF THE INVENTION

With the above-described configuration, the backlight unit described in JP2013-175386A switches between diffused light and light that travels in the normal direction by causing light to be incident into the lattice plane of reflective hologram layer in opposite directions from the first light source and the second light source.

That is, in the backlight unit described in JP2013-175386A, for example, the lattice plane of the reflective hologram layer is tilted obliquely to the upper light side with respect to the light guide plate, the first light source is disposed on the right side of the light guide plate, and the second light source is disposed on the left side of the light guide plate.

In this case, light emitted from the first light source is incident into the lattice plane of the reflective hologram layer obliquely from the lower right side through the light guide plate, and is diffracted to the lower side (opposite to the light emission surface) of the light guide plate. Next, the light is diffuse-reflected upward by the reflector and is emitted from the light guide plate as diffused light.

On the other hand, light emitted from the second light source is incident into the lattice plane of the reflective hologram layer obliquely from the lower left side through the light guide plate, is diffracted to the upper side of the light guide plate substantially in the normal direction, and is emitted.

In the liquid crystal display device, the backlight unit described in JP2013-175386A can switch between display at a wide viewing angle by the diffused light where the first light source is used and display at a narrow viewing angle by the light substantially in the normal direction where the second light source is used.

However, in the backlight unit described in JP2013-175386A, as also shown in Examples below, irrespective of whether the first light source or the second light source is used, the brightness values on the "+" side and the "−" side at a polar angle with respect to the normal line of the light guide plate are asymmetric to each other.

As a result, in the liquid crystal display device including the backlight unit described in JP2013-175386A, even in a case where a displayed image is seen from the same angle, the brightness of the image seen from the right side of the screen is different from that seen from the left side of the image.

An object of the present invention is to solve the above-described problems in the related art and to provide a backlight unit used in a liquid crystal display device and a liquid crystal display device including the backlight unit, the backlight unit being capable of switching between viewing angles in the liquid crystal display device and having a configuration in which the brightness values of emitted light on the "+" side and the "−" side at a polar angle with respect to the normal line are symmetric to each other.

In order to achieve the object, the present invention has the following configurations.

[1] A backlight unit comprising:
a light guide plate that has a long side and a short side;
a first light source that emits light such that the light is incident into the light guide plate from an edge surface of one of the long side or the short side of the light guide plate;
a second light source that emits light such that the light is incident into the light guide plate from an edge surface of another one of the long side or the short side of the light guide plate different from that of the first light source;
a first diffraction element that is provided on one main surface of the light guide plate and diffracts only light emitted from one of the first light source or the second light source:
a second diffraction element that is provided on another main surface of the light guide plate opposite to the first diffraction element and diffracts only light that is not diffracted by the first diffraction element in light emitted from another one of the first light source or the second light source; and
a reflection plate that is provided on a surface of the light guide plate opposite to a light emission surface.

[2] The backlight unit according to [1],
in which periods of periodic structures of the first diffraction element and the second diffraction element are 440 to 520 nm.

[3] The sensor according to [1] or [2],
in which at least one of the first diffraction element or the second diffraction element is a liquid crystal diffraction element including an optically-anisotropic layer that is formed of a composition including a liquid crystal compound, and
the optically-anisotropic layer has a liquid crystal alignment pattern in which a direction of an optical axis derived from the liquid crystal compound changes while continuously rotating in one in-plane direction.

[4] The backlight unit according to [3],
in which the optically-anisotropic layer is a cholesteric liquid crystal layer obtained by immobilizing a cholesteric liquid crystalline phase.

[5] The backlight unit according to any one of [1] to [4],
in which at least one of the first diffraction element or the second diffraction element includes two or three diffraction elements.

[6] The backlight unit according to [5],
in which at least one of the first diffraction element or the second diffraction element includes two diffraction elements,
a period of a periodic structure of one diffraction element is 440 to 480 nm, and
a period of a periodic structure of another diffraction element is 480 to 520 nm.

[7] The backlight unit according to [5],
in which at least one of the first diffraction element or the second diffraction element includes three diffraction elements,
a period of a periodic structure of one diffraction element is 380 to 420 nm,
a period of a periodic structure of another diffraction element is 460 to 520 nm, and
a period of a periodic structure of still another diffraction element is 540 to 580 nm.

[8] The backlight unit according to any one of [1] to [7],
in which a depolarizing degree of reflected light by the reflection plate with respect to incidence light is 30% or less.

[9] The backlight unit according to any one of [1] to [8], further comprising:
a diffusion layer that is provided at least either between the first light source and the light guide plate or between the second light source and the light guide plate.

[10] A liquid crystal display device comprising:
the backlight unit according to any one of [1] to [9]; and
a liquid crystal display element.

In the liquid crystal display device according to an aspect of the present invention, the viewing angle can be switched, the brightness values of emitted light on the "+" side and the "−" side at a polar angle with respect to the normal line can be made to be symmetric to each other, and an image having the same brightness can be displayed irrespective of whether the display image is seen from the right side or the left side.

DESCRIPTION OF THE PREFERRED EMBODIMENTS

Figure 1:
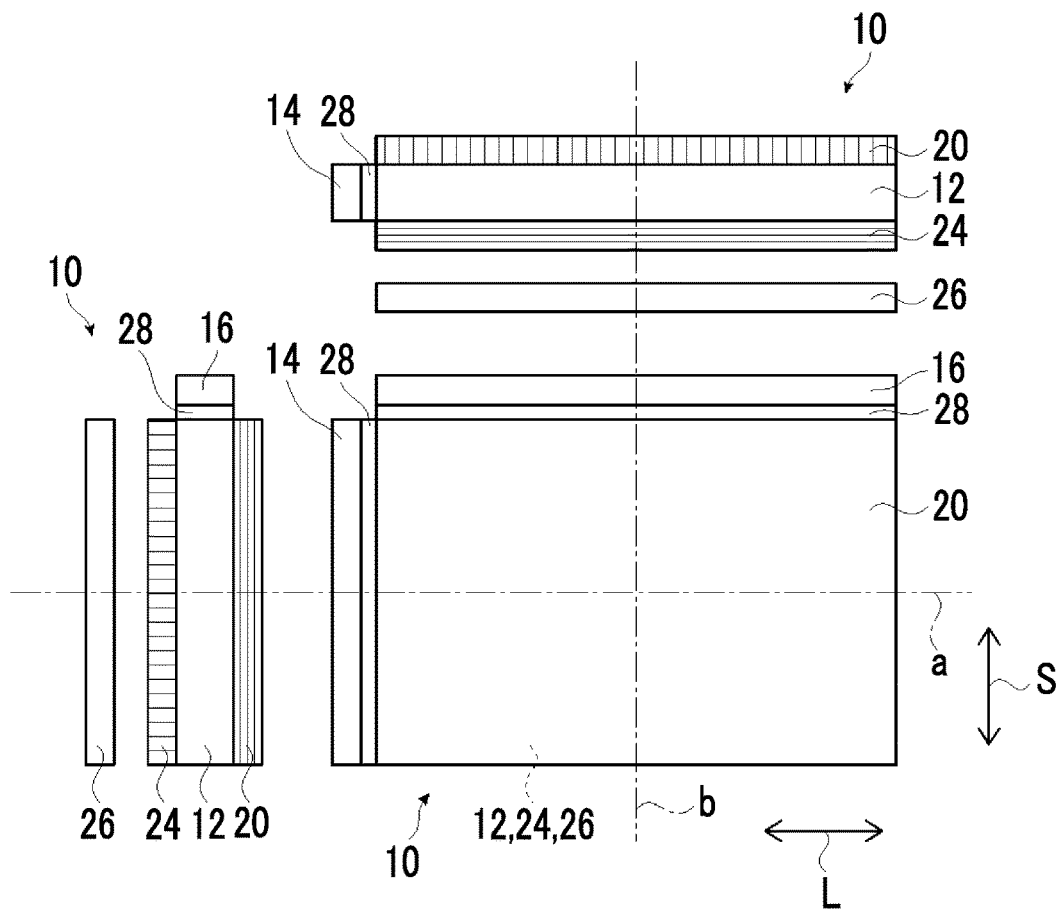
FIG. 1 is a diagram conceptually showing an example of a backlight unit according to an embodiment of the present invention.

Hereinafter, a backlight unit and a liquid crystal display device according to an embodiment of the present invention will be described in detail based on a preferable embodiment shown in the accompanying drawings.
In the present invention, numerical ranges represented by "to" include numerical values before and after "to" as lower limit values and upper limit values.
In this present invention, "(meth)acrylate" represents "either or both of acrylate and methacrylate".
FIG. 1 conceptually shows an example of the backlight unit according to the embodiment of the present invention.
In FIG. 1, the lower right side is a front view which is a diagram in a case where the backlight unit according to the embodiment of the present invention is seen from a light emission surface side. In addition, the upper side of FIG. 1 is a cross-sectional view taken along a center line a, and the lower left side is a cross-sectional view taken along a center line b. In order to show a periodic structure of a diffraction element described below, hatched portions are not shown in both of the cross-sectional views.

Figure 2:
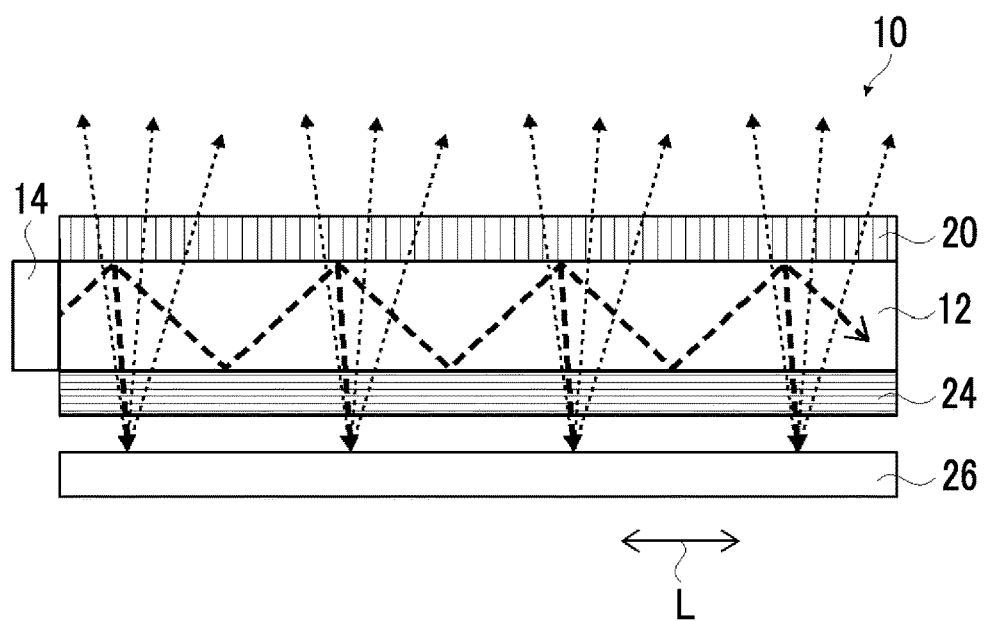
FIG. 2 is a conceptual diagram showing an action of the backlight unit shown in FIG. 1.
Figure 3:
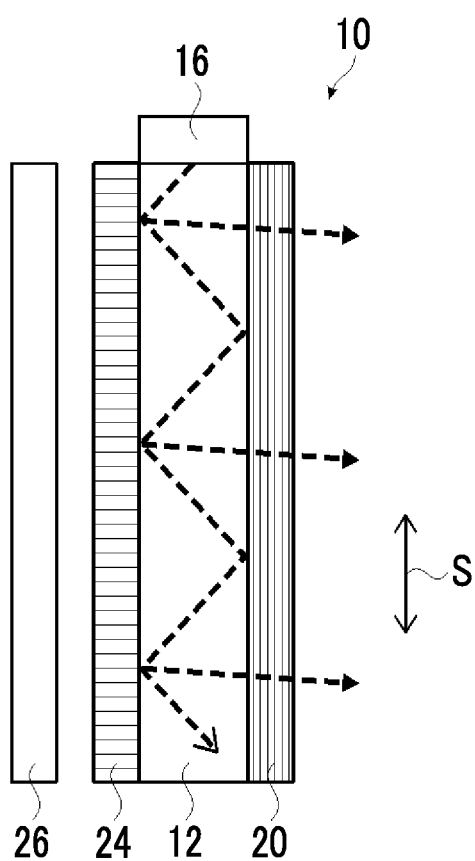
FIG. 3 is a conceptual diagram showing the action of the backlight unit shown in FIG. 1.

In the backlight unit shown in FIG. 1, a light emission direction, that is, an emission direction of backlight to a liquid crystal display element is a front side direction on the paper plane in the front view, an upper direction in the drawing in the cross-sectional view taken along the center line a on the upper side, and a right direction in the drawing in the cross-sectional view taken along the center line b on the lower left side (refer to FIGS. 2 and 3).

As shown in FIG. 1, a backlight unit 10 according to the embodiment of the present invention includes a light guide plate 12, a first light source 14, a second light source 16, a first diffraction element 20, a second diffraction element 24, and a reflection plate 26. In addition, in a preferable aspect, the backlight unit 10 includes a diffusion layer 28 that is provided between the light guide plate 12 and the first light source 14 and between the light guide plate 12 and the second light source 16.

In the backlight unit 10, the first diffraction element 20 side is an emission surface of light (backlight).

Although described below, in the backlight unit 10 shown in the drawing, the first light source 14 emits light such that the light is incident into the light guide plate 12 from an edge surface of a short side of the light guide plate 12, and the second light source 16 is incident into the light guide plate 12 from an edge surface of a long side of the light guide plate 12. In addition, the first diffraction element 20 diffracts only light that is emitted from the first light source 14 and propagates in the light guide plate 12 in a longitudinal direction, and the second diffraction element 24 diffracts only light that is emitted from the second light source 16 and propagates in the light guide plate 12 in a lateral direction. Further, in the backlight unit 10, the first diffraction element 20 side is a light emission surface.

However, the present invention is not limited to this configuration. That is, in the backlight unit according to the embodiment of the present invention, the first light source may emit light such that the light is incident into the light guide plate from the edge surface of the long side, and the second light source may emit light such that the light is incident into the light guide plate from the edge surface of the short side. In addition, the first light guide plate may diffract only light that is emitted from the second light source and propagates in the light guide plate, and the second light guide plate may diffract only light that is emitted from the first light source and propagates in the light guide plate. Further, in the backlight unit according to the embodiment of the present invention, the second light guide plate side may be the light emission surface.

That is, in the present invention, "first" and 'second' of the members are expressions that are added for convenience sake in order to distinguish between the individual members, and the expressions "first" and "second" and a combination of the members have no technical meaning.

The light guide plate 12 is a well-known light guide plate used in a so-called edge light mode backlight unit of a liquid crystal display device.

Accordingly, the light guide plate 12 is not particularly limited, and various well-known light guide plates can be used. In addition, the size, aspect ratio, thickness, forming materials, and the like of the light guide plate 12 are not particularly limited and may be appropriately set depending on the corresponding liquid crystal display device. In addition, optionally, the light guide plate 12 may include various portions and members in a well-known light guide plate for backlight, for example, a protrusion portion for light extraction.

In addition, the shape of a main surface of the light guide plate is not limited to a rectangular shape as in the example shown in the drawings. That is, the light guide plate can have various shapes as long as the shape has a main surface having a long side and a short side, for example, a shape having a small notch in four corners (one or more corners) of a rectangle.

In the backlight unit 10 in the example shown in the drawing, the first light source 14 is a light source that emits light such that the light as backlight is incident into the light guide plate 12 from the edge surface of the short side of the light guide plate 12. Accordingly, the light emitted from the first light source 14 propagates in the light guide plate 12 in the longitudinal direction of the light guide plate 12 (arrow L direction in the drawing).

On the other hand, the second light source 16 is a light source that emits light such that the light as backlight is incident into the light guide plate 12 from the edge surface of the long side of the light guide plate 12. Accordingly, the light emitted from the second light source 16 propagates in the light guide plate 12 in the lateral direction of the light guide plate 12 (arrow S direction in the drawing).

In the present invention, the first light source 14 and/or the second light source 16 is not limited to the configuration in which it is disposed only one short side and one long side of the light guide plate 12.

That is, in the backlight unit 10 according to the embodiment of the present invention, the first light source 14 and/or the second light source 16 may be optionally provided on both short sides and both long sides of the light guide plate 12.

In the backlight unit 10 according to the embodiment of the present invention, the first light source 14 and the second light source 16 are not particularly limited, and various well-known light sources used in an edge light mode backlight unit using a light guide plate can be used.

Examples of the light source include a light emitting diode (LED) that is arranged along an edge surface of a light guide plate, a laser light source that is arranged along an edge surface of a light guide plate, and a fluorescent lamp.

In addition, the first light source 14 and the second light source 16 may emit monochromatic light such as red light, green light, or blue light, may emit light of two or more colors, or may emit white light.

In addition, in a case where the first light source 14 and the second light source 16 emit white light, a white light source such as a fluorescent lamp may be used, or a combination of a red light source, a green light source, and a blue light source may emit white light.

The backlight unit 10 according to the embodiment of the present invention includes a controller that controls the lighting of the first light source 14 and the second light source 16 independently from each other. That is, the backlight unit 10 can switch between the lighting of only the first light source 14 and the lighting of only the second light source 16. In addition, the backlight unit 10 according to the embodiment of the present invention may control the first light source 14 and the second light source 16 to be lighted.

It is preferable that the backlight unit 10 according to the embodiment of the present invention includes a brightness adjustment unit that adjusts the brightness values (light amounts) of the first light source 14 and the second light source 16 individually.

In a preferable aspect, the backlight unit 10 in the example shown in the drawing includes a diffusion layer 28 that diffuses light and is provided between the first light source 14 and the light guide plate 12 and between the second light source 16 and the light guide plate 12.

By providing the diffusion layer 28, both of in-plane uniformity in the brightness of emitted light and a narrow viewing angle can be suitably realized.

Although described below, the backlight unit 10 according to the embodiment of the present invention can switch between a wide viewing angle and a narrow viewing angle in the liquid crystal display device by switching between irradiation of diffused light caused by driving the first light source 14 and irradiation of light traveling substantially in the normal direction of the light guide plate 12 caused by driving the second light source 16.

In a typical backlight unit, by disposing the diffusion plate downstream of the emission surface of the light guide plate in a light traveling direction and diffusing emitted light, the in-plane uniformity in the brightness of emitted light, that is, backlight is improved.

However, at the narrow viewing angle of the liquid crystal display device, in the backlight unit according to the embodiment of the present invention that emits the light traveling substantially in the normal direction of the light guide plate 12, in a case where the diffusion plate is provided downstream of the emission surface of the light guide plate in the light traveling direction, the light traveling substantially in the normal direction of the light guide plate 12 is diffused. As a result, the effect of the narrow viewing angle in the liquid crystal display device can be reduced.

On the other hand, in a case where the diffusion plate is disposed downstream of the emission surface of the light guide plate in the light traveling direction, the in-plane uniformity in the brightness of emitted light, that is, backlight deteriorates. As a result, in an image displayed by the liquid crystal display device, brightness unevenness occurs in an in-plane direction.

On the other hand, in a preferable aspect, the backlight unit 10 according to the embodiment of the present invention includes the diffusion layer 28 that is provided between the first light source 14 and the light guide plate 12 and between the second light source 16 and the light guide plate 12.

As a result, the light incident into the light guide plate can be sufficiently diffused to the light guide plate 12, the in-plane uniformity in the brightness of emitted light can be secured, the diffusion of the light substantially in the normal direction for the narrow viewing angle can also be prevented, and the narrow viewing angle in the liquid crystal display device can be suitably realized.

The diffusion layer 28 is not particularly limited, and various well-known transmission type diffusion layers can be used.

Examples of the diffusion layer 28 include frosted glass, a transparent plate on which a roughening treatment such as sandblasting is performed, and a film obtained by diffusing silicone-based or acrylic diffuser beads in a resin base film such as polystyrene, polycarbonate, an acrylic resin, or a methyl methacrylate-styrene copolymer.

The thickness of the diffusion layer 28 is not particularly limited, and the thickness for obtaining the sufficient light diffusion effect may be appropriately set depending on the kind of the diffusion layer 28.

In the present invention, the diffusion layer 28 is not limited to the configuration in which it is provided between the first light source 14 and the light guide plate 12 and between second light source 16 and the light guide plate 12. That is, the diffusion layer 28 may be provided either between the first light source 14 and the light guide plate 12 or between the second light source 16 and the light guide plate 12.

However, in order to suitably realize the in-plane uniformity in the brightness of emitted light and the narrow viewing angle at the same time, it is preferable that the diffusion layer 28 is provided between the first light source 14 and the light guide plate 12 and between the second light source 16 and the light guide plate 12.

The first diffraction element 20 is provided on the light emission surface side among main surfaces of the light guide plate 12. In addition, the second diffraction element 24 is provided on a surface opposite to the light emission surface side among the main surfaces of the light guide plate 12. The main surface is the maximum surface of a sheet-shaped material (a film or a plate-shaped material).

Both of the first diffraction element 20 and the second diffraction element 24 are reflective diffraction elements (diffraction gratings).

Here, the first diffraction element 20 diffracts only the light that is emitted from the first light source 14 and propagates in the light guide plate 12 in the longitudinal direction, and does not diffract the light that is not emitted from the second light source 16. That is, the first diffraction element 20 has a periodic structure of the diffraction element in the longitudinal direction of the light guide plate 12 (arrow L direction in the drawing) that is a propagation direction of the light emitted from the first light source 14.

On the other hand, the second diffraction element 24 diffracts only the light that is emitted from the second light source 16 and propagates in the light guide plate 12 in the lateral direction, and does not diffract the light that is not emitted from the first light source 14. That is, the second diffraction element 24 has a periodic structure of the diffraction element in the lateral direction of the light guide plate 12 (arrow S direction in the drawing) that is a propagation direction of the light emitted from the second light source 16.

The periodic structure of the diffraction element is a repeating structure in the diffraction element.

For example, in a diffraction element in which linear grooves are arranged in a flat plate, the periodic structure is provided in a direction in which the grooves are arranged. In a diffraction element in which a recess portion and a protrusion portion are alternately formed, the periodic structure is provided in a direction where the recess portion and the protrusion portion are formed. In the liquid crystal diffraction element described below, the periodic structure is provided in a liquid crystal alignment pattern of an optically-anisotropic layer in one in-plane direction in which a direction of an optical axis derived from a liquid crystal compound rotates.

In addition, the first diffraction element 20 is designed such that light that is emitted from the first light source 14, propagates in the longitudinal direction (arrow L direction) of the light guide plate 12, and is incident into the light guide plate 12 at an angle more than a critical angle is reflected in the normal direction of the main surface of the light guide plate 12. On the other hand, the second diffraction element 24 is designed such that light that is emitted from the second light source 16, propagates in the lateral direction (arrow S direction) of the light guide plate 12, and is incident into the light guide plate 12 at an angle more than a critical angle is reflected in the normal direction of the main surface of the light guide plate 12.

The angle (degree) of diffraction by the first diffraction element 20 and the second diffraction element may be adjusted using a well-known method such as a method of adjusting the length of the period in the periodic structure.

In the following description, the normal line refers to the normal line of the main surface of the light guide plate 12. In addition, in the following description, the longitudinal direction refers to the longitudinal direction of the light guide plate 12, and the lateral direction refers to the lateral direction of the light guide plate 12.

The periods of the periodic structures of the first diffraction element 20 and the second diffraction element 24 are not particularly limited. Here, the periods of the periodic structures of the first diffraction element 20 and the second diffraction element 24 are preferably 440 to 520 nm, more preferably 450 to 510 nm, and still more preferably 460 to 500 nm.

The diffraction of light by the diffraction element is affected by the period of the periodic structure, and as the period of the periodic structure increases, the light is diffracted more largely. On the other hand, the diffraction of light by the diffraction element is also affected by the wavelength of the light to be diffracted, and as the wavelength increases, the light is diffracted more largely.

Accordingly, by adjusting the periods of the periodic structure of the first diffraction element 20 and the second diffraction element 24 to be 440 to 520 nm, the light that is incident into the diffraction element at an angle more than the critical angle can be suitably diffracted substantially in the normal direction to correspond to a wide wavelength range.

The first diffraction element 20 and/or the second diffraction element 24 may include two or three diffraction elements. As a result, the diffraction of light substantially in the normal direction by the first diffraction element 20 and/or the second diffraction element 24 can be more suitably performed, and a variation in the tint of emitted light from the backlight unit 10 can be suitably suppressed.

This point will be described below.

The reflection plate 26 is disposed on the surface of the light guide plate 12 opposite to the light emission surface, that is, the second diffraction element 24 side.

The reflection plate 26 reflects light emitted from the surface of the light guide plate 12 opposite to the light emission surface to the light emission surface of the light guide plate 12.

The reflection plate 26 is not particularly limited, and various well-known reflection plates that are provided on the surface of the light guide plate opposite to the light emission surface in the edge light mode backlight unit can be used. Examples of the reflection plate 26 include a metal plate, a white plate, and a diffuse reflection plate.

The depolarizing degree of reflected light by the reflection plate 26 with respect to incidence light is preferably 30% or less. The depolarizing degree of reflected light by the reflection plate 26 with respect to incidence light is 20% or less and 10% or less.

In a case where the first diffraction element 20 and the second diffraction element 24 are the liquid crystal diffraction elements described below, both of the diffraction elements basically diffract circularly polarized light. Here, in a case where circularly polarized light reflected by the reflection plate 26 is depolarized, the state of diffraction of light that is incident again into the liquid crystal diffraction element changes such that the light cannot be appropriately diffracted.

On the other hand, by using the reflection plate 26 where the depolarizing degree of reflected light with respect to incidence light is 30% or less, the polarization state of the circularly polarized light reflected by the reflection plate 26 can be maintained, and the light can be appropriately diffracted by the first diffraction element 20 and the second diffraction element 24.

Examples of the reflection plate 26 where the depolarizing degree of reflected light with respect to incidence light is 30% or less include a reflector obtained by bonding a transparent support where inorganic particles having a small particle diameter are dispersed to a specular reflector and a metal plate where unevenness is provided on the surface.

The depolarizing degree by the reflection plate 26 is measured, for example, using the following method.

For example, in a case where the depolarizing degree of right circularly polarized light is measured, a right circular polarization plate is provided before an appropriately selected light source, right circular polarization plate is caused to transmit through the right circular polarization plate, and a brightness $Y_R$ of right circularly polarized light and a brightness $Y_L$ of left circularly polarized light in the reflected light by the reflection plate 26 are measured.

In addition, the depolarizing degree is calculated from the following equation.

$$\text{Depolarizing degree } [\%] = 100 \times (1 - (Y_L - Y_R)/(Y_L + Y_R))$$

Hereinafter, an action of the backlight unit 10 will be described with reference to FIGS. 2 and 3.

In order to simply the drawings, FIGS. 2 and 3 do not show the diffusion layer 28 that is provided between the first light source 14 and the light guide plate 12 and between the second light source 16 and the light guide plate 12.

In addition, in FIGS. 2 and 3, directions in which the diffraction grating is seen are different by 90°. Therefore, even the same diffraction grating is shown as different patterns in the drawing.

FIG. 2 is a diagram conceptually showing a state where the first light source 14 of the backlight unit 10 is lighted.

In the backlight unit 10, the first light source 14 emits light such that the light is incident into the light guide plate 12 from the edge surface of the short side. Accordingly, the light emitted from the first light source 14 propagates in the longitudinal direction (arrow L direction in the drawing) of the light guide plate 12 while repeating total reflection in the light guide plate 12 as indicated by a broken line in FIG. 2.

As described above, the longitudinal direction refers to the longitudinal direction of the light guide plate 12, and the lateral direction refers to the lateral direction of the light guide plate 12.

In the light that is emitted from the first light source 14 and propagates in the longitudinal direction, the light exceeding the critical angle is incident from the light guide plate 12 into the first diffraction element 20.

As described above, the first diffraction element 20 is a reflective diffraction element having the periodic structure in the longitudinal direction and diffracts only the light that is emitted from the first light source 14 and propagates in the light guide plate 12 in the longitudinal direction. In addition, the first diffraction element 20 is designed such that the light that is emitted from the first light source 14, propagates in the longitudinal direction, and is incident at an angle more than the critical angle is reflected in the normal direction. As described above, the normal line refers to the normal line of the main surface of the light guide plate 12.

Accordingly, the light that is incident into the first diffraction element 20 is diffracted substantially in the normal direction to the reflection plate 26 opposite to the emission surface.

The second diffraction element 24 is a reflective diffraction element having the periodic structure in the lateral direction of the light guide plate 12 and does not emit the light that is emitted from the first light source 14 and propagates in the longitudinal direction.

Accordingly, even in a case where the light that is emitted from the first light source 14 and propagates in the longitudinal direction is incident into the second diffraction element 24 at an angle more than the critical angle, the light transmits through the second diffraction element 24 without being affected, is reflected by the reflection plate 26, and returns to the light guide plate 12.

The light that is diffracted substantially in the normal direction by the first diffraction element 20 transmits through the light guide plate 12 and the second diffraction element 24 and is incident into the reflection plate 26.

The light that is incident into the reflection plate 26 is diffuse-reflected by the reflection plate 26, transmits through the second diffraction element 24, the light guide plate 12, and the first diffraction element 20 as indicated by thin broken lines in FIG. 2, and is emitted from the backlight unit 10 as diffused light.

Accordingly, in a case where the light (backlight) that drives the first light source 14 is used, the viewing angle in the liquid crystal display device can be set to a wide viewing angle.

FIG. 3 is a diagram conceptually showing a state where the second light source 16 of the backlight unit 10 is lighted.

In the backlight unit 10, the second light source 16 emits light such that the light is incident into the light guide plate 12 from the edge surface of the long side. Accordingly, the light emitted from the second light source 16 propagates in the lateral direction (arrow S direction in the drawing) of the light guide plate 12 while repeating total reflection in the light guide plate 12 as indicated by a broken line in FIG. 3.

In the light that is emitted from the second light source 16 and propagates in the lateral direction, the light exceeding the critical angle is incident from the light guide plate 12 into the second diffraction element 24.

As described above, the second diffraction element 24 is a reflective diffraction element having the periodic structure in the lateral direction and diffracts only the light that is emitted from the second light source 16 and propagates in the lateral direction. In addition, the second diffraction element 24 is designed such that the light that is emitted from the second light source 16, propagates in the lateral direction, and is incident at an angle more than the critical angle is reflected in the normal direction.

Accordingly, the light that is incident into the second diffraction element 24 is diffracted substantially in the normal direction to the emission surface, that is, the first diffraction element 20 side.

The first diffraction element 20 is a reflective diffraction element having the periodic structure in the longitudinal direction of the light guide plate 12 and does not emit the light that is emitted from the second light source 16 and propagates in the lateral direction.

Accordingly, even in a case where the light that is emitted from the second light source 16 and propagates in the lateral direction is incident into the first diffraction element 20 at an angle more than the critical angle, the light transmits through the first diffraction element 20 without being affected and is emitted from the backlight unit 10.

This light exceeds the critical angle and travels in a direction close to the normal direction, and thus has little effect on the narrow viewing angle.

The light that is diffracted substantially in the normal direction by the second diffraction element 24 transmits through the light guide plate 12 and the first diffraction element 20 and is emitted from the backlight unit 10 substantially in the normal direction.

Accordingly, in a case where the light (backlight) that drives the second light source 16 is used, the viewing angle in the liquid crystal display device can be set to a narrow viewing angle.

As described above, by switching between lighting of the first light source 14 and lighting of the second light source 16, the backlight unit 10 according to the embodiment of the present invention can suitably switch between display at a wide viewing angle and display at a narrow viewing angle in the liquid crystal display device.

In addition, in the backlight unit according to the embodiment of the present invention, the brightness values of emitted light on the "+" side and the "−" side at a polar angle with respect to the normal line can be made to be symmetric to each other, and an image having the same brightness can be displayed irrespective of whether the display image is seen from the right side or the left side.

In the backlight unit described in JP2013-175386A, light components emitted from the light sources disposed on the sides of the light guide plate opposite to each other are reflected substantially in the normal directions opposite to each other by one diffraction element to switch between a wide viewing angle and a narrow viewing angle. Specifically, in the backlight unit described in JP2013-175386A, by one reflective diffraction element (reflective hologram layer), light corresponding to the wide viewing angle that is emitted from one light source is diffracted substantially in the normal direction opposite to the emission surface, and light corresponding to the narrow viewing angle that is emitted from another light source is diffracted to the emission surface substantially in the normal direction, that is, transmits through the diffraction element.

In this case, in order to diffract light such that there is no brightness unevenness, ideally, both of the light components emitted from the two light sources are diffracted in the normal direction.

However, in the backlight unit described in JP2013-175386A, the light components that propagate in the opposite directions are reflected in the opposite directions by one diffraction element. Therefore, in a case where the diffraction element is designed such that the light is diffracted in the normal direction for the wide viewing angle, the diffraction direction of the light for the narrow viewing angle largely deviates from the normal direction.

In addition, in a case where the diffraction element is designed such that the diffraction direction of any light is close to the normal direction, the diffraction direction deviates from the normal direction.

As a result, as also shown in Examples, the brightness values of emitted light on the "+" side and the "−" side at a polar angle with respect to the normal line are asymmetric to each other, and there is a difference in brightness in the display image seen from the right side and the display image seen from the left side.

On the other hand, the backlight unit 10 according to the embodiment of the present invention includes the two diffraction elements corresponding to the wide viewing angle and the narrow viewing angle, respectively.

Therefore, in the backlight unit according to the embodiment of the present invention, the first diffraction element 20 corresponding to the wide viewing angle and the second diffraction element 24 corresponding to the narrow viewing angle are designed such that the light is appropriately diffracted in the normal direction depending on whether the light is emitted from the first light source 14 or the second light source. As a result, in the backlight unit according to the embodiment of the present invention, both of the light for the wide viewing angle that is emitted from the first light source 14 and the light for the narrow viewing angle that is emitted from the second light source 16 can be diffracted substantially in the normal direction.

As a result, in the backlight unit according to the embodiment of the present invention, the brightness values of emitted light on the "+" side and the "−" side at a polar angle with respect to the normal line can be made to be symmetric to each other, and an image having the same brightness can be displayed irrespective of whether the display image is seen from the right side or the left side.

In the backlight unit according to the embodiment of the present invention, the first diffraction element and the second diffraction element are not limited to a reflective diffraction element and may be a transmissive diffraction element. That is, in the backlight unit according to the embodiment of the present invention, as long as the first diffraction element and the second diffraction element are the same as a reflective type or a transmissive type, any one of a reflective diffraction element or a transmissive diffraction element can be used.

In the backlight unit according to the embodiment of the present invention, in a case where the transmissive diffraction element is used, the light emitted from the first light source is diffracted substantially in the normal direction by the first diffraction element as the emission surface side, transmits through the first diffraction element, and is emitted substantially in the normal direction. As a result, the light corresponding to the narrow viewing angle is emitted.

In addition, the light emitted from the second light source is diffracted by the second diffraction element as the side opposite to the emission surface, transmits through the second diffraction element, and is incident into the reflection plate as the light substantially in the normal direction. The light that is diffuse-reflected by the reflection plate transmits through the second diffraction element, the light guide plate, and the first diffraction element, and the light corresponding to the wide viewing angle is emitted as diffused light.

In the backlight unit 10 according to the embodiment of the present invention, the first diffraction element 20 and the second diffraction element 24 are not particularly limited, and various well-known diffraction elements (diffraction gratings) can be used. In addition, the first diffraction element 20 and the second diffraction element 24 may be a reflective type or a transmissive type as long as they are the same type.

Examples of the diffraction element include a diffraction element in which linear grooves are arranged on a flat plate, a diffraction element in which a recess portion and a protrusion portion are alternately formed, a diffraction element in which two regions having different refractive indices are alternately formed, and a saw-toothed diffraction element.

In particular, preferable examples of the liquid crystal diffraction element are as follows. Specifically, in the preferable example, the liquid crystal diffraction element includes an optically-anisotropic layer that is formed of a composition including a liquid crystal compound, in which the optically-anisotropic layer has a liquid crystal alignment pattern in which a direction of an optical axis derived from the liquid crystal compound changes while continuously rotating in one in-plane direction.

In particular, for example, a liquid crystal diffraction element in which the optically-anisotropic layer having the liquid crystal alignment pattern is a cholesteric liquid crystal layer obtained by immobilizing a cholesteric liquid crystalline phase is more preferable.

In the backlight unit 10 according to the embodiment of the present invention, it is preferable that one of the first diffraction element 20 or the second diffraction element 24 is the above-described liquid crystal diffraction element, and it is more preferable that both of the first diffraction element 20 or the second diffraction element 24 are the above-described liquid crystal diffraction elements.

Figure 4:
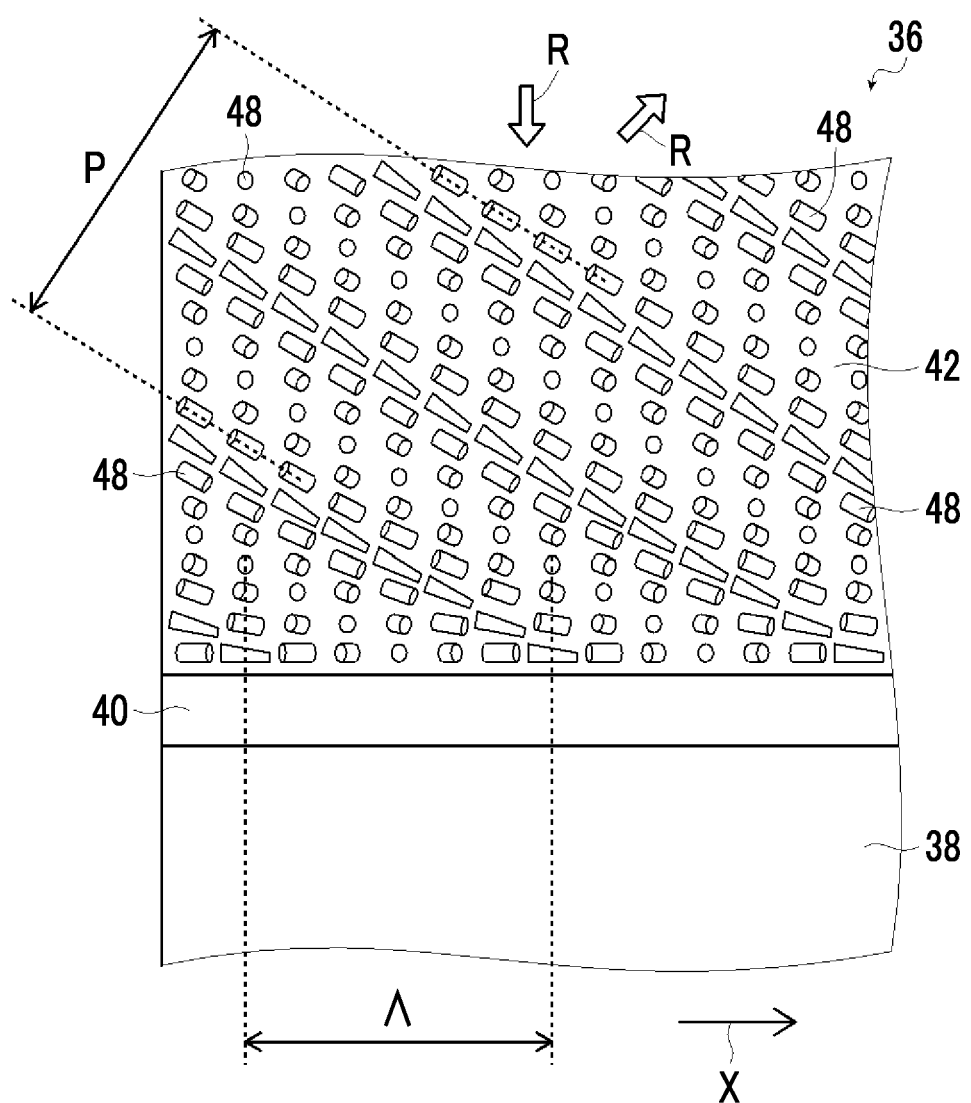
FIG. 4 is a diagram conceptually showing an example of a liquid crystal diffraction element used in a backlight unit according to the present invention.

FIG. 4 conceptually shows, as the optically-anisotropic layer, an example of the liquid crystal diffraction element including the cholesteric liquid crystal layer having the liquid crystal alignment pattern.

A liquid crystal diffraction element 36 shown in FIG. 4 includes a support 38, an alignment film 40, and a cholesteric liquid crystal layer 42.

The cholesteric liquid crystal layer 42 is obtained by immobilizing a cholesteric liquid crystalline phase. The cholesteric liquid crystal layer 42 is the optically-anisotropic layer in the liquid crystal diffraction element used in the backlight unit 10 according to the embodiment of the present invention. Accordingly, the cholesteric liquid crystal layer 42 has a liquid crystal alignment pattern in which a direction of an optical axis 48A derived from a liquid crystal compound 48 changes while continuously rotating in at least one in-plane direction (refer to FIG. 5).

the liquid crystal diffraction element 36 including the cholesteric liquid crystal layer 42 is a reflective diffraction element.

[Support]

In the liquid crystal diffraction element 36, the support 38 supports the alignment film 40 and the cholesteric liquid crystal layer 42.

As the support 38, various sheet-shaped materials can be used as long as they can support the alignment film 40 and the cholesteric liquid crystal layer 42.

A transmittance of the support 38 with respect to corresponding light is preferably 50% or higher, more preferably 70% or higher, and still more preferably 85% or higher.

The thickness of the support 38 is not particularly limited and may be appropriately set depending on the use of the liquid crystal diffraction element 36, flexibility or rigidity required for the liquid crystal diffraction element 36, a difference in thickness required for the liquid crystal diffraction element 36, a material for forming the support 38, and the like in a range where the alignment film 40 and the cholesteric liquid crystal layer can be supported.

The thickness of the support 38 is preferably 1 to 1000 µm, more preferably 3 to 250 µm, and still more preferably 5 to 150 µm.

The support 38 may have a monolayer structure or a multi-layer structure.

In a case where the support 38 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 38 has a multi-layer structure, examples thereof include a support including: one of the above-described supports having a monolayer structure that is provided as a substrate; and another layer that is provided on a surface of the substrate.

[Alignment Film]

In the liquid crystal diffraction element 36, the alignment film 40 is formed on a surface of the support 38.

The alignment film 40 is an alignment film for aligning the liquid crystal compound 48 to a predetermined liquid crystal alignment pattern during the formation of the cholesteric liquid crystal layer 42.

Although described below, the cholesteric liquid crystal layer 42 has the liquid crystal alignment pattern in which the direction of the optical axis 48A (refer to FIG. 2) derived from the liquid crystal compound 48 changes while continuously rotating in one in-plane direction.

Accordingly, the alignment film 40 is formed such that the cholesteric liquid crystal layer 42 can form the liquid crystal alignment pattern.

In the following description, "the direction of the optical axis 48A rotates" will also be simply referred to as "the optical axis 48A rotates".

As the alignment film 40, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 40 formed by a rubbing treatment can be formed by rubbing a surface of a polymer layer with paper or fabric in a given direction multiple times.

As the material used for the alignment film 40, for example, a material for forming polyimide, polyvinyl alcohol, a polymer having a polymerizable group described in JP1997-152509A (JP-H9-152509A), or an alignment film 40 such as JP2005-97377A, JP2005-99228A, and JP2005-128503A is preferable.

The alignment film 40 for forming the cholesteric liquid crystal layer 42 according to the embodiment of the present invention can be suitably used as a so-called photo-alignment film obtained by irradiating a photo-alignment material with polarized light or non-polarized light. That is, in the present invention, a photo-alignment film that is formed by applying a photo-alignment material to the support 38 is suitably used as the alignment film 40.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A. JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 40 is not particularly limited. The thickness with which a required alignment function can be obtained may be appropriately set depending on the material for forming the alignment film 40.

The thickness of the alignment film 40 is preferably 0.01 to 5 μm and more preferably 0.05 to 2 μm.

A method of forming the alignment film 40 is not limited. Any one of various well-known methods corresponding to a material for forming the alignment film 40 can be used. For example, a method including: applying the alignment film 40 to a surface of the support 38; drying the applied alignment film 40; and exposing the alignment film 40 to laser light to form an alignment pattern can be used.

Figure 7:
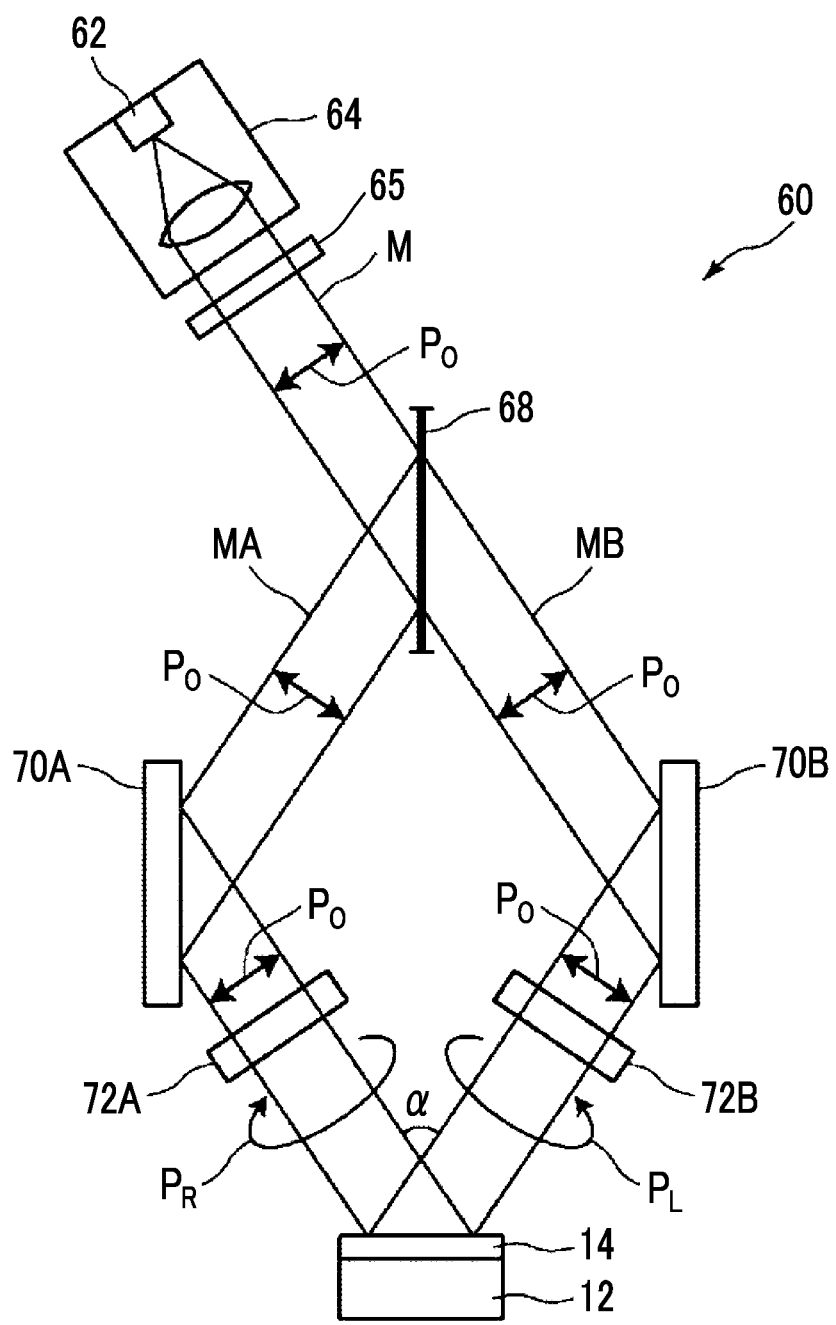
FIG. 7 is a diagram conceptually showing an example of an exposure device that exposes an alignment film of the liquid crystal diffraction element shown in FIG. 4.

FIG. 7 conceptually shows an example of an exposure device that exposes the alignment film 40 to form an alignment pattern corresponding to the liquid crystal alignment pattern.

An exposure device 60 shown in FIG. 7 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plates 72A and 72B have optical axes parallel to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 38 including the alignment film 40 on which the alignment pattern is not yet formed is disposed at an exposed portion, the two beams MA and MB intersect and interfere each other on the alignment film 40, and the alignment film 40 is irradiated with and exposed to the interference light.

Due to the interference in this case, the polarization state of light with which the alignment film 40 is irradiated periodically changes according to interference fringes. As a result, in the alignment film 40, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 48A derived from the liquid crystal compound 48 continuously rotates in the one in-plane direction, the length of the single period over which the optical axis 48A rotates by 180° in the one in-plane direction in which the optical axis 48A rotates can be adjusted.

By forming the cholesteric liquid crystal layer on the alignment film 40 having the alignment pattern in which the alignment state periodically changes, as described below, the cholesteric liquid crystal layer having the liquid crystal alignment pattern in which the optical axis 48A derived from the liquid crystal compound 48 continuously rotates in the one in-plane direction can be formed.

In addition, by rotating the optical axes of the λ/4 plates 72A and 72B by 90°, respectively, the rotation direction of the optical axis 48A can be reversed.

In the liquid crystal diffraction element 36, the alignment film 40 is provided as a preferable aspect and is not an essential component.

For example, the following configuration can also be adopted, in which, by forming the alignment pattern on the support 38 using a method of rubbing the support 38, a method of processing the support 38 with laser light or the like, or the like, the cholesteric liquid crystal layer or the like has the liquid crystal alignment pattern in which the direction of the optical axis 48A derived from the liquid crystal compound 48 changes while continuously rotating in at least one in-plane direction. That is, in the present invention, the support 38 can be made to function as the alignment film.

[Cholesteric Liquid Crystal Layer]

In the liquid crystal diffraction element 36, the cholesteric liquid crystal layer 42 is formed on a surface of the alignment film 40.

The cholesteric liquid crystal layer 42 is obtained by immobilizing a cholesteric liquid crystalline phase. That is, the cholesteric liquid crystal layer 42 is a layer formed of the liquid crystal compound 48 (liquid crystal material) having a cholesteric structure.

As described above, the cholesteric liquid crystal layer 42 is the optically-anisotropic layer in the liquid crystal diffraction element used in the backlight unit 10 according to the embodiment of the present invention.

The cholesteric liquid crystal phase has a helical structure in which the liquid crystal compound 48 is helically turned and laminated. In the helical structure, a configuration in which the liquid crystal compound 48 is helically turned once (rotated by 360) and laminated is set as one helical pitch, and plural pitches of the helically turned liquid crystal compound 48 are laminated. That is, one helical pitch is a pitch P shown in FIG. 4.

In other words, one helical pitch refers to the length of one helical winding, that is, the length in a helical axis direction in which a director (in a rod-shaped liquid crystal, a major axis direction) of the liquid crystal compound constituting the cholesteric liquid crystalline phase rotates by 360°.

Figure 6:
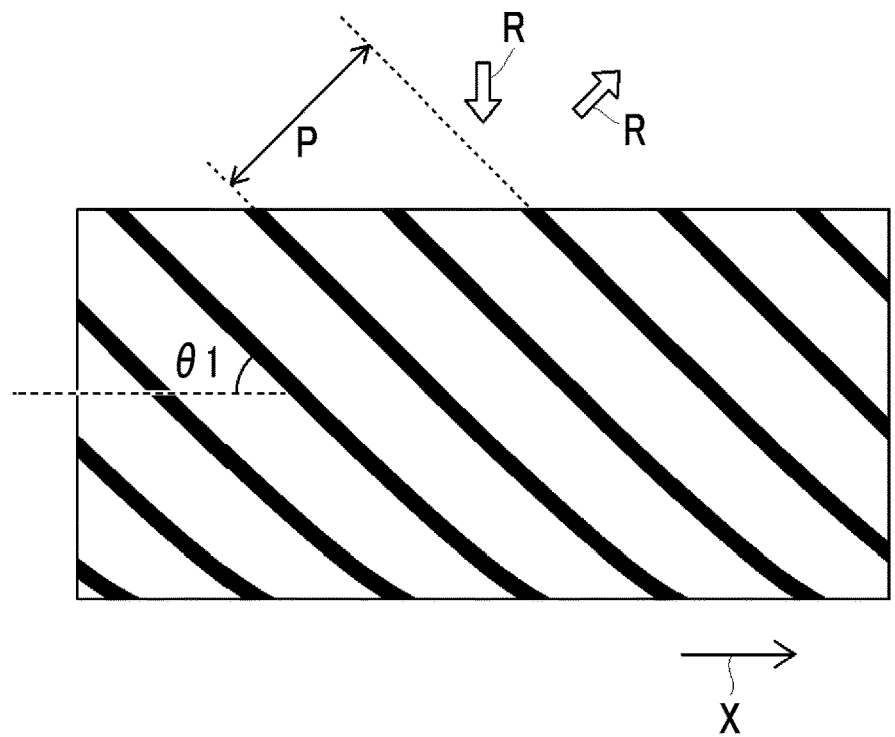
FIG. 6 is a diagram conceptually showing a cross-sectional SEM image of the cholesteric liquid crystal layer of the liquid crystal diffraction element shown in FIG. 4.

Here, in a cross-section of the cholesteric liquid crystal layer observed with a SEM, a stripe pattern including bright portions (bright lines) and dark portions (dark lines) derived from the cholesteric liquid crystalline phase is observed. That is, in the cross-section of the cholesteric liquid crystal layer, a layered structure in which the bright portions and the dark portions are alternately laminated in the thickness direction is observed (refer to FIG. 6).

In the cholesteric liquid crystalline phase, a structure in which the bright portion and the dark portion are repeated twice corresponds to one helical pitch. The structure in which the bright portion B and the dark portion D are repeated twice includes three dark portions (bright portions) and two bright portions (dark portions) (refer to FIG. 6). Therefore, one helical pitch (pitch P) of the cholesteric liquid crystal layer, that is, the reflective layer can be measured from a SEM cross-sectional view.

<Cholesteric Liquid Crystalline Phase>

It is known that the cholesteric liquid crystalline phase exhibits selective reflectivity at a specific wavelength.

A center wavelength of selective reflection (selective reflection center wavelength) k of a general cholesteric liquid crystalline phase depends on the length (pitch P, refer to FIG. 4) of one helical pitch in the cholesteric liquid crystalline phase and complies with a relationship of $\lambda = n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry". (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

The cholesteric liquid crystal layer 42 shown in FIG. 4 has a right helical twisted direction, and thus selectively reflects right circularly polarized light in a selective wavelength range.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical laminate and may be, for example, 10 to 500 nm and is preferably 20 to 300 nm and more preferably 30 to 100 nm.

<Liquid Crystal Alignment Pattern of Cholesteric Liquid Crystal Layer>

In the liquid crystal diffraction element 36, the cholesteric liquid crystal layer 42 has the liquid crystal alignment pattern in which the direction of the optical axis 48A derived from the liquid crystal compound 48 forming the cholesteric liquid crystalline phase changes while continuously rotating in the one in-plane direction of the cholesteric liquid crystal layer.

The optical axis 48A derived from the liquid crystal compound 48 is an axis having the highest refractive index in the liquid crystal compound 48, that is, a so-called slow axis. For example, in a case where the liquid crystal compound 48 is a rod-shaped liquid crystal compound, the optical axis 48A is along a rod-shaped major axis direction. In the following description, the optical axis 48A derived from the liquid crystal compound 48 will also be referred to as "the optical axis 48A of the liquid crystal compound 48" or "the optical axis 48A".

Figure 5:
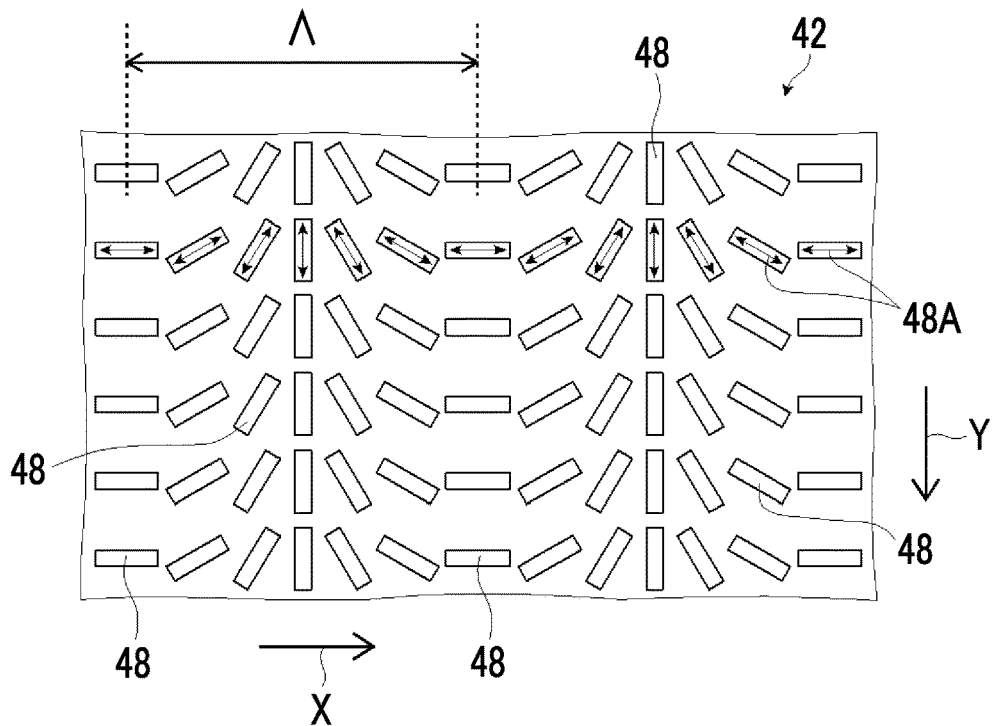
FIG. 5 is a plan view showing a cholesteric liquid crystal layer of the liquid crystal diffraction element shown in FIG. 4.

FIG. 5 conceptually shows a plan view of the cholesteric liquid crystal layer 42.

The plan view is a view in a case where the cholesteric liquid crystal layer 42 (liquid crystal diffraction element 36) is seen from the top in FIG. 4, that is, a view in a case where the liquid crystal diffraction element 36 is seen from a thickness direction (laminating direction of the respective layers (films)).

In addition, in FIG. 5, in order to clarify the configuration of the cholesteric liquid crystal layer 42, only the liquid crystal compound 48 on the surface of the alignment film 40 is shown.

As shown in FIG. 5, on the surface of the alignment film 40, the liquid crystal compound 48 forming the cholesteric liquid crystal layer 42 is two-dimensionally arranged according to the alignment pattern formed on the alignment film 40 as the lower layer in a predetermined in-plane direction indicated by arrow X and a direction perpendicular to the one in-plane direction (arrow X direction).

In the following description, the direction perpendicular to the arrow X direction will be referred to as "Y direction" for convenience of description. That is, in FIG. 4, the Y direction is a direction perpendicular to the paper plane.

In addition, the liquid crystal compound 48 forming the cholesteric liquid crystal layer 42 has the liquid crystal alignment pattern in which the direction of the optical axis 48A changes while continuously rotating in the arrow X direction in a plane of the cholesteric liquid crystal layer 42. In the example shown in the drawing, the liquid crystal compound 48 has the liquid crystal alignment pattern in which the optical axis 48A of the liquid crystal compound 48 changes while continuously rotating counterclockwise in the arrow X direction.

In the liquid crystal diffraction element 36, the periodic structure (repeating structure) in the diffraction element has the arrow X direction in which the direction of the optical axis 48A changes while continuously rotating.

Regarding this point, the same can also be applied to the liquid crystal diffraction element described below.

Specifically, "the direction of the optical axis 48A of the liquid crystal compound 48 changes while continuously rotating in the arrow X direction (the predetermined one in-plane direction)" represents that an angle between the optical axis 48A of the liquid crystal compound 48, which is arranged in the arrow X direction, and the arrow X direction varies depending on positions in the arrow X direction, and the angle between the optical axis 48A and the arrow X direction sequentially changes from θ to θ+180° or θ−180° in the arrow X direction.

A difference between the angles of the optical axes 48A of the liquid crystal compound 48 adjacent to each other in the arrow X direction is preferably 45° or less, more preferably 15° or less, and still more preferably less than 15°.

On the other hand, in the liquid crystal compound 48 forming the cholesteric liquid crystal layer 42, the directions of the optical axes 48A are the same in the Y direction perpendicular to the arrow X direction, that is, the Y direction perpendicular to the one in-plane direction in which the optical axis 48A continuously rotates.

In other words, in the liquid crystal compound 48 forming the cholesteric liquid crystal layer 42, angles between the optical axes 48A of the liquid crystal compound 48 and the arrow X direction are the same in the Y direction.

In the liquid crystal diffraction element 36, in the liquid crystal alignment pattern of the liquid crystal compound 48, the length (distance) over which the optical axis 48A of the liquid crystal compound 48 rotates by 180° in the arrow X direction in which the optical axis 48A changes while continuously rotating in a plane is the length A of the single period in the liquid crystal alignment pattern. That is, a distance between centers of two liquid crystal compounds 48 in the arrow X direction is the length A of the single period, the two liquid crystal compounds having the same angle in the arrow X direction.

Specifically, as shown in FIGS. 1 and 2, a distance of centers in the arrow X direction of two liquid crystal compounds 48 in which the arrow X direction and the direction of the optical axis 48A match each other is the length A of the single period. In the following description, the length A of the single period will also be referred to as "single period A".

In the liquid crystal diffraction element 36, in the liquid crystal alignment pattern of the cholesteric liquid crystal layer, the single period A is repeated in the arrow X direction, that is, in the one in-plane direction in which the direction of the optical axis 48A changes while continuously rotating.

In the liquid crystal diffraction element 36, the length A (single period A) over which the optical axis 48A of the liquid crystal compound 48 rotates by 180° is the period of the periodic structure in the diffraction element.

Accordingly, in the liquid crystal diffraction element 36, as the single period A decreases, light is diffracted more largely. In the liquid crystal diffraction element 36 as the reflective diffraction element, as the single period A decreases, a difference in the reflection angle of light with respect to specular reflection increases.

Regarding this point, the same can also be applied to the liquid crystal diffraction element described below.

The cholesteric liquid crystal layer 42 shown in FIG. 1 reflects right circularly polarized light R in a selective wavelength range.

Accordingly, in a case where light is incident into the cholesteric liquid crystal layer 42, the cholesteric liquid crystal layer 42 reflects only right circularly polarized light R in the selective wavelength range and allows transmission of the other light.

Here, a typical cholesteric liquid crystal layer not having the liquid crystal alignment pattern in a plane reflects incident circularly polarized light by specular reflection.

On the other hand, the cholesteric liquid crystal layer 42 that has the liquid crystal alignment pattern in which the optical axis 48A changes while continuously rotating in the arrow X direction in a plane reflects incident circularly polarized light in a direction tilted in the arrow X direction with respect to specular reflection.

Hereinafter, this point will be described.

In a case where the right circularly polarized light R incident into the cholesteric liquid crystal layer 42 is reflected from the cholesteric liquid crystal layer, the absolute phase changes depending on the directions of the optical axes 48A of the respective liquid crystal compounds 48.

Here, in the cholesteric liquid crystal layer 42, the optical axis 48A of the liquid crystal compound 48 changes while rotating in the arrow X direction (the one in-plane direction). Therefore, the amount of change in the absolute phase of the incident right circularly polarized light R varies depending on the direction of the optical axis 48A.

Further, the liquid crystal alignment pattern formed in the cholesteric liquid crystal layer 42 is a pattern that is periodic in the arrow X direction. Therefore, an absolute phase that is periodic in the arrow X direction corresponding to the direction of the optical axis 48A is assigned to the right circularly polarized light R incident into the cholesteric liquid crystal layer 42.

In addition, the direction of the optical axis 48A of the liquid crystal compound 48 with respect to the arrow X direction is uniform in the arrangement of the liquid crystal compound 48 in the Y direction perpendicular to arrow X direction.

As a result, in the cholesteric liquid crystal layer 42, an equiphase surface that is tilted to fall in the arrow X direction with respect to an XY plane is formed for the right circularly polarized light R. The equiphase surface is formed to connect the liquid crystal compounds 48 that are helically turned and in which the directions of the optical axes 48A match with each other in the turning direction.

In the cholesteric liquid crystal layer 42, the equiphase surface functions as a reflecting surface.

In a cross-section of the cholesteric liquid crystalline phase observed with a SEM, a stripe pattern including bright portions and dark portions derived from the cholesteric liquid crystalline phase is observed.

As is well known, the bright portions and the dark portions of the cholesteric liquid crystalline phase are formed to connect the liquid crystal compounds 48 that are helically turned and in which the directions of the optical axes 48A match with each other in the turning direction. That is, the bright portions and the dark portions match with the above-described equiphase surface.

Here, bright portions and dark portions of a typical cholesteric liquid crystal layer are parallel to the main surface, that is, the alignment surface that is the formation surface.

On the other hand, the cholesteric liquid crystal layer 42 has the liquid crystal alignment pattern in which the optical axis 48A changes while continuously rotating in the arrow X direction in a plane. Accordingly, as conceptually shown in FIG. 6, bright portions and dark portions of the cholesteric liquid crystal layer 42 are tilted to fall in the arrow X direction with respect to the main surface, that is, the alignment film 40 according to the arrangement of the liquid crystal compounds 48 in which the directions of the optical axes 48A match with each other in the helical turning direction.

Therefore, the incident right circularly polarized light R are reflected in the normal direction of the bright portions and the dark portions, that is, the equiphase surface and are reflected in a direction tilted in the arrow X direction with respect to the XY plane (main surface of the cholesteric liquid crystal layer).

By reversing the rotation direction of the optical axis 48A of the liquid crystal compound 48 toward the arrow X direction, a reflection direction of the right circularly polarized light R can be reversed. That is, in FIGS. 4 and 5, the rotation direction of the optical axis 48A toward the arrow X direction is counterclockwise, and the right circularly polarized light R is reflected in a state where it is tilted in the arrow X direction. By setting the rotation direction of the optical axis 48A to be clockwise, the tilt direction of the bright portions and the dark portions is reversed, and the right circularly polarized light R is reflected in a state where it is tilted in a direction opposite to the arrow X direction. In other words, this aspect is the same as a case where the arrow X direction in which the optical axis 48A rotates counterclockwise is reversed.

Further, as described above, in the cholesteric liquid crystal layer 42 that reflects right circularly polarized light and the cholesteric liquid crystal layer that reflects left circularly polarized light, the helical turning directions of the liquid crystal compounds 48 are opposite to each other. Accordingly, in the cholesteric liquid crystal layer that reflects left circularly polarized light and have the liquid crystal alignment pattern in which the optical axis 48A rotates counterclockwise in the arrow X direction as in the example shown in the drawing, the tilt direction of the bright portions and the dark portions is opposite, and thus the left circularly polarized light is reflected toward a direction opposite to the arrow X direction.

<Method of Forming Cholesteric Liquid Crystal Layer>

The cholesteric liquid crystal layer 42 can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, it is preferable that the structure in which a cholesteric liquid crystalline phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 48 in the cholesteric liquid crystal layer does not necessarily exhibit liquid crystallinity. For example, the molecular weight of the polymerizable liquid crystal compound may be increased by a curing reaction such that the liquid crystallinity thereof is lost.

A method of forming the cholesteric liquid crystal layer 42 is not limited, and various well-known forming methods can be used.

In particular, in the following forming method, the cholesteric liquid crystal layer 42 can be stably and suitably formed, which is preferable.

<<Liquid Crystal Composition>>

Examples of a material used for forming the cholesteric liquid crystal layer 42 obtained by immobilizing a cholesteric liquid crystalline phase include a liquid crystal composition including a liquid crystal compound and a chiral agent. It is preferable that the liquid crystal compound is a polymerizable liquid crystal compound.

In addition, the liquid crystal composition used for forming the cholesteric liquid crystal layer may further include a surfactant or the like.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound.

As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group.

Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9% by mass, more preferably 80% to 99% by mass, and still more preferably 85% to 90% by mass with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment control agent contributing to the stable or rapid formation of a cholesteric liquid crystalline phase with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01% to 10% by mass, more preferably 0.01% to 5% by mass, and still more preferably 0.02% to 1% by mass with respect to the total mass of the liquid crystal compound.

—Alignment Control Agent—

In a case where the liquid crystal composition is applied to the alignment film, at least one additive (alignment control agent) for providing the region having a pretilt angle may be added to at least one of an alignment film side or an air interface side. By adding the above-described additive to the composition, the region having a pretilt angle can be provided in the optical element.

In particular, in a case where the liquid crystal composition is applied to the alignment film, it is preferable that an air interface alignment agent may be added in order to provide a pretilt angle to the air interface side. As a result, the region having a pretilt angle can be formed in at least one of upper and lower interfaces of the cholesteric liquid crystal layer 42 (optically-anisotropic layer).

—Onium Salt—

In a case where the liquid crystal composition is applied to the alignment film, the composition may include at least one onium salt in order to provide the region having a pretilt angle on the alignment film side.

The onium salt contributes to providing a constant pretilt angle to molecules of the rod-shaped liquid crystal compound on the alignment film interface side. Examples of the onium salt include an onium salt such as an ammonium salt, a sulfonium salt, or a phosphonium. A quaternary onium salt is preferable, and a quaternary ammonium salt is more preferable.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

The chiral agent in which back isomerization, dimerization, isomerization, dimerization or the like occurs due to light irradiation such that the helical twisting power (HTP) decreases can also be suitably used.

In addition, the chiral agent in which back isomerization, dimerization, isomerization, dimerization or the like occurs due to a temperature change such that the HTP decreases can also be suitably used.

In addition, as the chiral agent, a chiral agent in which the HTP changes due to light irradiation or a temperature change and a chiral agent in which the HTP does not change due to light irradiation or a temperature change may be used in combination.

Further, for example, in order to adjust the length pitch P of one helical pitch, chiral agents having different helical turning directions to be induced may be used in combination.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable.

Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1% to 20% by mass and more preferably 0.5% to 12% by mass with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20% by mass and more preferably 5% to 15% by mass with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer (cholesteric liquid crystal layer 42) is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

<<Formation of Cholesteric Liquid Crystal Layer>>

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, the above-described liquid crystal composition including the liquid crystal compound and the chiral agent is applied to the alignment film 40 having an alignment pattern corresponding to the above-described liquid crystal alignment pattern in which the direction of the optical axis 48A rotates in at least one in-plane direction.

For the application of the liquid crystal composition, a printing method such as ink jet or scroll printing or a well-known method such as spin coating, bar coating, or spray coating capable of uniformly applying liquid to a sheet-shaped material can be used.

The thickness of the coating film of the liquid crystal composition is not particularly limited and may be appropriately set depending on the thickness of the formed cholesteric liquid crystal layer 42.

After the coating film of the liquid crystal composition is formed, a heating step of heating the liquid crystal composition is performed. Through the heating treatment, the liquid crystal compound 48 is aligned as described above.

The heating treatment temperature is not particularly limited, and it is preferable that the heating treatment is performed at a temperature TI in a temperature range of a crystal-nematic phase transition temperature (Cr—Ne phase transition temperature) to a nematic-isotropic phase transition temperature (Ne-Iso phase transition temperature) of the liquid crystal compound 48.

The heating treatment time is also not particularly limited and is preferably 10 to 600 seconds, more preferably 15 to 300 seconds, and still more preferably 30 to 200 seconds.

By performing an exposure step of exposing the liquid crystal composition after the end of the heating step, the liquid crystal composition is cured to form the cholesteric liquid crystal layer 42.

In the exposure step, the exposure may be performed once. However, a first exposure step may be performed after the heating treatment, and subsequently a second exposure step of emitting light having a wavelength different from that of the first exposure step may be performed.

By performing the two-step exposure using the chiral agent in which the HTP decreases due to light irradiation, one helical pitch (pitch P) is extended in the first exposure step, and the liquid crystal composition is cured in the second exposure step.

The light used for the exposure is not particularly limited, and it is preferable to use ultraviolet light. The wavelength of irradiated ultraviolet light is preferably 250 to 430 nm.

The total irradiation energy is preferably 2 mJ/cm$^2$ to 50 J/cm$^2$ and more preferably 5 to 1500 mJ/cm$^2$. In order to promote a photopolymerization reaction, the exposure may be performed under heating conditions or in a nitrogen atmosphere.

The thickness of the cholesteric liquid crystal layer 42 is not particularly limited and may be appropriately set depending on the selective reflection center wavelength of the cholesteric liquid crystal layer 42, the reflectivity (diffraction efficiency) required for the cholesteric liquid crystal layer 42, and the like.

The liquid crystal diffraction element 36 shown in FIG. 4 includes the support 38, the alignment film 40, and the cholesteric liquid crystal layer 42. The liquid crystal diffraction element used in the backlight unit according to the embodiment of the present invention is not limited to this configuration.

That is, the liquid crystal diffraction element used in the backlight unit according to the embodiment of the present invention may consist of the alignment film 40 and the cholesteric liquid crystal layer 42 by peeling off the support 38 after forming the liquid crystal diffraction element 36. Alternatively, as in Examples described below, the liquid crystal diffraction element used in the backlight unit according to the embodiment of the present invention may consist of only the cholesteric liquid crystal layer 42 by peeling off the support 38 and the alignment film 40 after forming the liquid crystal diffraction element 36.

In addition, in the backlight unit according to the embodiment of the present invention, the liquid crystal diffraction element may be formed by transfer, for example, by bonding a laminate including the support 38, the alignment film 40, and the cholesteric liquid crystal layer 42 to the light guide plate 12 and subsequently peeling the alignment film 40 and the cholesteric liquid crystal layer 42. Further, in the backlight unit according to the embodiment of the present invention, the liquid crystal diffraction element may be formed by transfer, for example, by bonding a laminate including the support 38, the alignment film 40, and the cholesteric liquid crystal layer 42 to the light guide plate 12 and subsequently peeling the cholesteric liquid crystal layer 42.

Regarding this point, the same can also be applied to the liquid crystal diffraction element described below.

Figure 8:
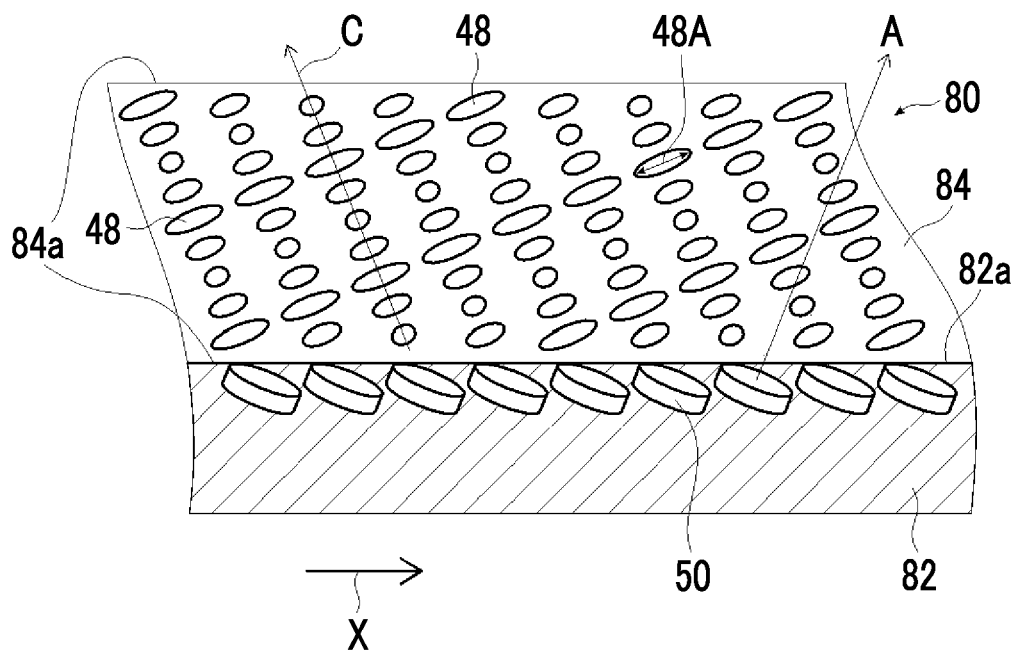
FIG. 8 is a diagram conceptually showing another example of the liquid crystal diffraction element used in the backlight unit according to the present invention.

FIG. 8 shows another example of the liquid crystal diffraction element including the cholesteric liquid crystal layer having the liquid crystal alignment pattern.

The liquid crystal diffraction element 80 shown in FIG. 8 includes: a liquid crystal layer 82 that is formed of a disk-shaped liquid crystal compound 50; and a cholesteric liquid crystal layer 84 that is disposed in contact with the liquid crystal layer 82.

On a surface of the liquid crystal layer 82 in contact with the cholesteric liquid crystal layer 84, a tilt alignment surface 82a w % here a molecular axis A of the disk-shaped liquid crystal compound 50 is tilted with respect to the surface of the liquid crystal layer 82 is provided. That is, on the tilt alignment surface 82a, the disk-shaped liquid crystal compound 50 is aligned such that the molecular axis A thereof is tilted with respect to the surface of the liquid crystal layer 82.

In the cholesteric liquid crystal layer 84, the optical axis 48A of the liquid crystal compound 48 is tilted and aligned with respect to a main surface 84a.

This cholesteric liquid crystal layer 84 is also formed of the above-described liquid crystal composition. By forming the cholesteric liquid crystal layer 84 on the tilt alignment surface 82a in which the molecular axis A of the disk-shaped liquid crystal compound 50 is tilted with respect to the surface of the liquid crystal layer 82, the alignment of the liquid crystal compound 48 is restricted by the tilt alignment surface 82a, and thus the optical axis 48A is aligned to be tilted with respect to the tilt alignment surface 82a.

By tilting and aligning the optical axis 48A, the cholesteric liquid crystal layer 84 has the liquid crystal alignment pattern in which the optical axis 48A derived from the liquid crystal compound 48 changes while continuously rotating in the one in-plane direction (arrow X direction).

By tilting and aligning the optical axis 48A, as shown in FIG. 8, in the cholesteric liquid crystal layer 84, a helical axis C derived from a cholesteric liquid crystalline phase is tilted at a predetermined angle with respect to the main surface 84a That is, in the reflecting surface of the cholesteric liquid crystal layer 84, that is, in the above-described cross-section observed with the SEM, bright portions and dark portions are tilted in a substantially constant direction with respect to the main surface 84a (refer to FIG. 5).

As a result, as in the above-described example, the cholesteric liquid crystal layer 84 also reflects circularly polarized light at the selective reflection wavelength at different angles with respect to specular reflection.

As a method of tilting and aligning the disk-shaped liquid crystal compound 50 in the liquid crystal layer 82, well-known methods can be used.

For example, a method of forming a layer of a liquid crystal composition including the disk-shaped liquid crystal compound 50 for forming the liquid crystal layer 82 using a substrate where a rubbed alignment film having a pretilt angle is disposed on a surface can be used. In another method, a surfactant is added to liquid crystal composition including the disk-shaped liquid crystal compound 50 for forming the liquid crystal layer 82.

The above-described liquid crystal diffraction element is a reflective liquid crystal diffraction element, but the present invention is not limited thereto. That is, in the backlight unit according to the embodiment of the present invention, a transmissive liquid crystal diffraction element can also be suitably used as the liquid crystal diffraction element.

Figure 9:
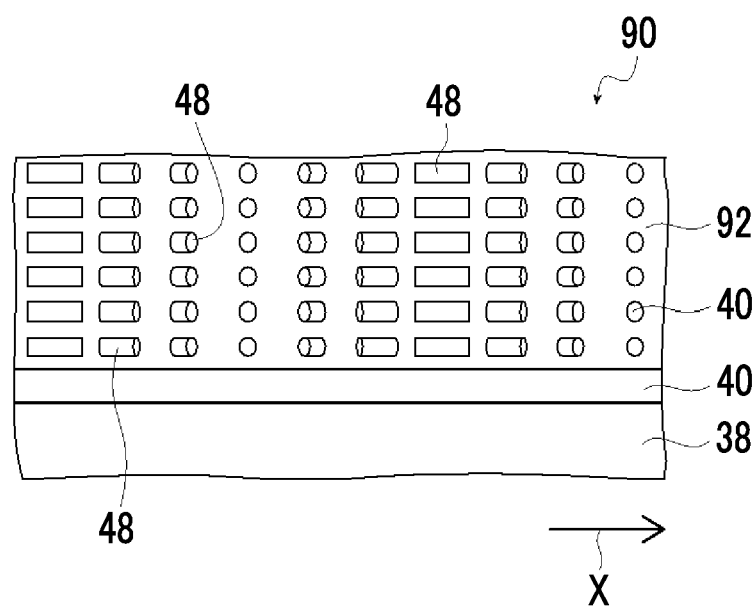
FIG. 9 is a diagram conceptually showing another example of the liquid crystal diffraction element used in the backlight unit according to the present invention.

FIG. 9 conceptually shows an example of the transmissive liquid crystal diffraction element.

A liquid crystal diffraction element 9X) shown in FIG. 9 includes the support 38, the alignment film 40, and a patterned liquid crystal layer 92.

In the liquid crystal diffraction element 90, the patterned liquid crystal layer 92 is an optically-anisotropic layer in the liquid crystal diffraction element used in the backlight unit 10 according to the embodiment of the present invention.

Accordingly, the patterned liquid crystal layer 92 has the same liquid crystal alignment pattern as that of the cholesteric liquid crystal layer 42. That is, as in the cholesteric liquid crystal layer 42 of the reflective liquid crystal diffraction element 36 shown in FIG. 4, as conceptually shown in FIG. 5, the patterned liquid crystal layer 92 also has the liquid crystal alignment pattern in which the optical axis 48A of the liquid crystal compound 48 continuously rotates clockwise in the arrow X direction.

As described above, the liquid crystal diffraction element 90 also ahs the periodic structure (repeating structure) of the diffraction element in the arrow X direction.

In the patterned liquid crystal layer 92, the liquid crystal compound 48 is not helically twisted and rotated in the thickness direction, and the optical axis 48A faces the same direction in the thickness direction. The patterned liquid crystal layer 92 can be formed by adding a chiral agent to a liquid crystal composition during the formation of the cholesteric liquid crystal layer 42.

In the liquid crystal diffraction element 90, the support 38 and the alignment film 40 are the same as those of the liquid crystal diffraction element 36 shown in FIG. 4.

As described above, the patterned liquid crystal layer 92 has the liquid crystal alignment pattern in which the direction of the optical axis 48A derived from the liquid crystal compound 48 changes while continuously rotating in the arrow X direction in a plane, that is, in the one in-plane direction indicated by arrow X.

On the other hand, regarding the liquid crystal compound 48 forming the patterned liquid crystal layer 92, the liquid crystal compounds 48 having the same direction of the optical axes 48A are arranged at regular intervals in the Y direction perpendicular to the arrow X direction, that is, the Y direction perpendicular to the one in-plane direction in which the optical axis 48A continuously rotates. In other words, regarding the liquid crystal compound 48 forming the patterned liquid crystal layer 92, in the liquid crystal compounds 48 arranged in the Y direction, angles between the directions of the optical axes 48A and the arrow X direction are the same.

In the liquid crystal compounds arranged in the Y direction in the patterned liquid crystal layer 92, the angles between the optical axes 48A and the arrow X direction (the one in-plane direction in which the direction of the optical axis of the liquid crystal compound 48 rotates) are the same.

In regions where the liquid crystal compounds 48 in which the angles between the optical axes 48A and the arrow X direction are the same are disposed in the Y direction, it is preferable that an in-plane retardation (Re) value of each of the regions is a half wavelength, that is, $\lambda/2$. In the following description, this region will be referred to as "region R" for convenience sake.

The in-plane retardation of the region R is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 48 in the direction of the optical axis 48A and a refractive index of the liquid crystal compound 48 in a direction perpendicular to the optical axis 48A in a plane of the region R. That is, the difference $\Delta n$ in refractive index is the same as the difference in refractive index of the liquid crystal compound 48.

In a case where circularly polarized light is incident into the above-described patterned liquid crystal layer 92, the light is refracted such that the direction of the circularly polarized light is converted.

Figure 10:
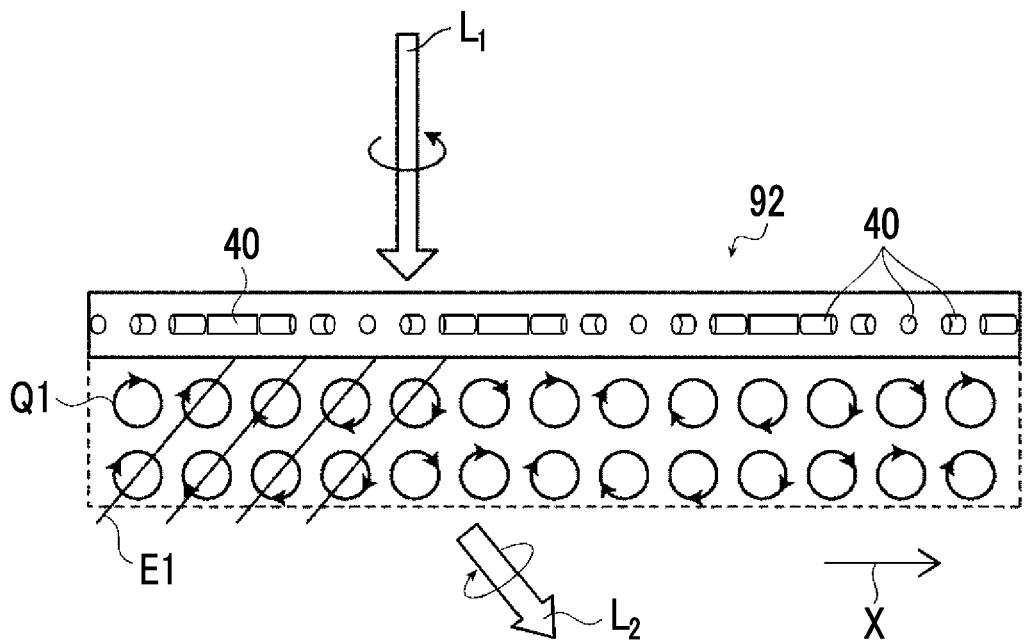
FIG. 10 is a conceptual diagram showing the action of the liquid crystal diffraction element shown in FIG. 9.
Figure 11:
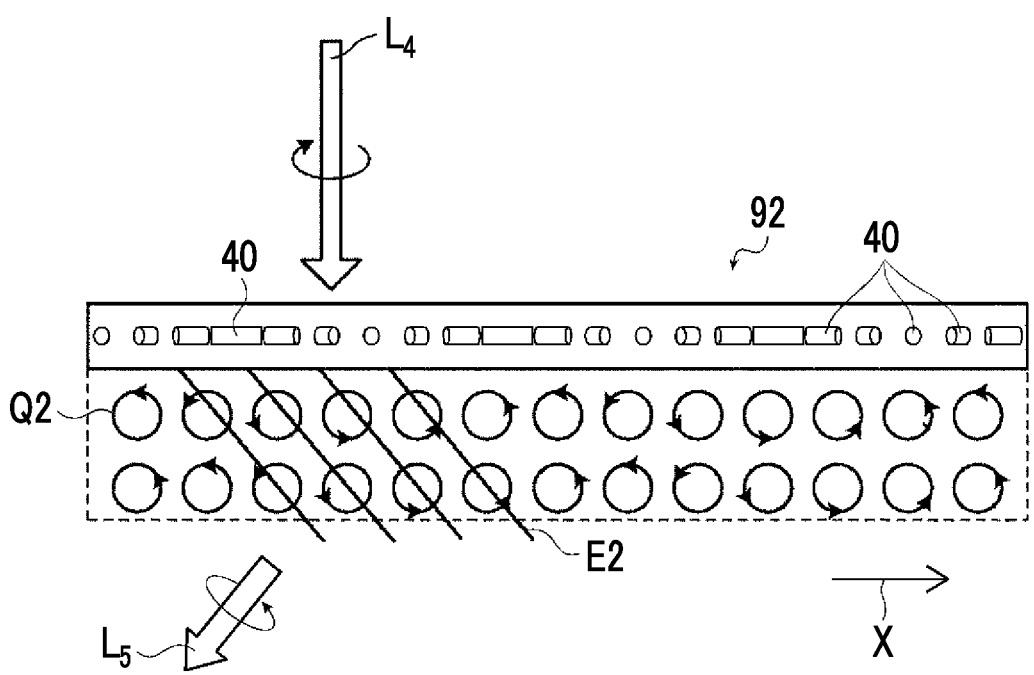
FIG. 11 is a conceptual diagram showing an action of the liquid crystal diffraction element shown in FIG. 9.

This action is conceptually shown in FIGS. 10 and 11. In the patterned liquid crystal layer 92, the value of the product of the difference in refractive index of the liquid crystal compound and the thickness of the optically-anisotropic layer is $\lambda/2$.

As shown in FIG. 10, in a case where the value of the product of the difference in refractive index of the liquid crystal compound in the patterned liquid crystal layer 92 and the thickness of the optically-anisotropic layer is $\lambda/2$ and incidence light L as left circularly polarized light is incident into the patterned liquid crystal layer 92, the incidence light $L_1$ transmits through the patterned liquid crystal layer 92 to be imparted with a phase difference of 180°, and the transmitted light $L_2$ is converted into right circularly polarized light.

In addition, in a case where the incidence light $L_1$ transmits through the patterned liquid crystal layer 92, an absolute phase thereof changes depending on the direction of the optical axis 48A of each of the liquid crystal compounds 48. In this case, the direction of the optical axis 48A changes while rotating in the arrow X direction. Therefore, the amount of change in the absolute phase of the incidence light $L_1$ varies depending on the direction of the optical axis 48A. Further, the liquid crystal alignment pattern that is formed in the patterned liquid crystal layer 92 is a pattern that is periodic in the arrow X direction. Therefore, as shown in FIG. 10, the incidence light $L_1$ transmitted through the patterned liquid crystal layer 92 is imparted with an absolute phase Q1 that is periodic in the arrow X direction corresponding to the direction of each of the optical axes 48A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as shown in FIG. 11, in a case where the value of the product of the difference in refractive index of the liquid crystal compound in the patterned liquid crystal layer 92 and the thickness of the optically-anisotropic layer is λ/2 and incidence light $L_4$ of right circularly polarized light is incident into the patterned liquid crystal layer 92, the incidence light $L_4$ transmits through the patterned liquid crystal layer 92 to be imparted with a phase difference of 180°, and the transmitted light is converted into transmitted light $L_5$ of left circularly polarized light.

In addition, in a case where the incidence light $L_4$ transmits through the patterned liquid crystal layer 92, an absolute phase thereof changes depending on the direction of the optical axis 48A of each of the liquid crystal compounds 48. In this case, the direction of the optical axis 48A changes while rotating in the arrow X direction. Therefore, the amount of change in the absolute phase of the incidence light $L_4$ varies depending on the direction of the optical axis 48A. Further, the liquid crystal alignment pattern that is formed in the patterned liquid crystal layer 92 is a pattern that is periodic in the arrow X direction. Therefore, as shown in FIG. 11, the incidence light $L_4$ transmitted through the patterned liquid crystal layer 92 is imparted with an absolute phase Q2 that is periodic in the arrow X direction corresponding to the direction of each of the optical axes 48A.

Here, the incidence light $L_4$ is right circularly polarized light. Therefore, the absolute phase Q2 that is periodic in the arrow X direction corresponding to the direction of the optical axis 48A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

As in the cholesteric liquid crystal layer 42, by changing the single period A of the liquid crystal alignment pattern formed in the patterned liquid crystal layer 92, refraction angles of the transmitted light components $L_2$ and $L_5$ can be adjusted. Specifically, even in the patterned liquid crystal layer 92, as the single period A of the liquid crystal alignment pattern decreases, light components transmitted through the liquid crystal compounds 48 adjacent to each other more strongly interfere with each other. Therefore, the transmitted light components $L_2$ and $L_5$ can be more largely refracted.

In addition, as in the cholesteric liquid crystal layer 42, the single period A the period of the periodic structure in the diffraction element.

In addition, as in the cholesteric liquid crystal layer 42, even in the patterned liquid crystal layer 92, as the wavelengths of the incidence light components $L_1$ and $L_4$ increase, the transmitted light components $L_2$ and $L_5$ are more largely refracted.

Further, by reversing the rotation direction of the optical axis 48A of the liquid crystal compound 48 that rotates in the arrow X direction, the refraction direction of transmitted light can be reversed. That is, in the example FIGS. 9 to 11, the rotation direction of the optical axis 48A toward the arrow X direction is clockwise. By setting this rotation direction to be counterclockwise, the refraction direction of transmitted light can be reversed.

In the backlight unit 10 shown in FIG. 1, the first diffraction element 20 and the second diffraction element 24 include one diffraction element, but the present invention is not limited thereto.

That is, in the present invention, the first diffraction element and/or the second diffraction element may be two or three diffraction elements.

Figure 12:
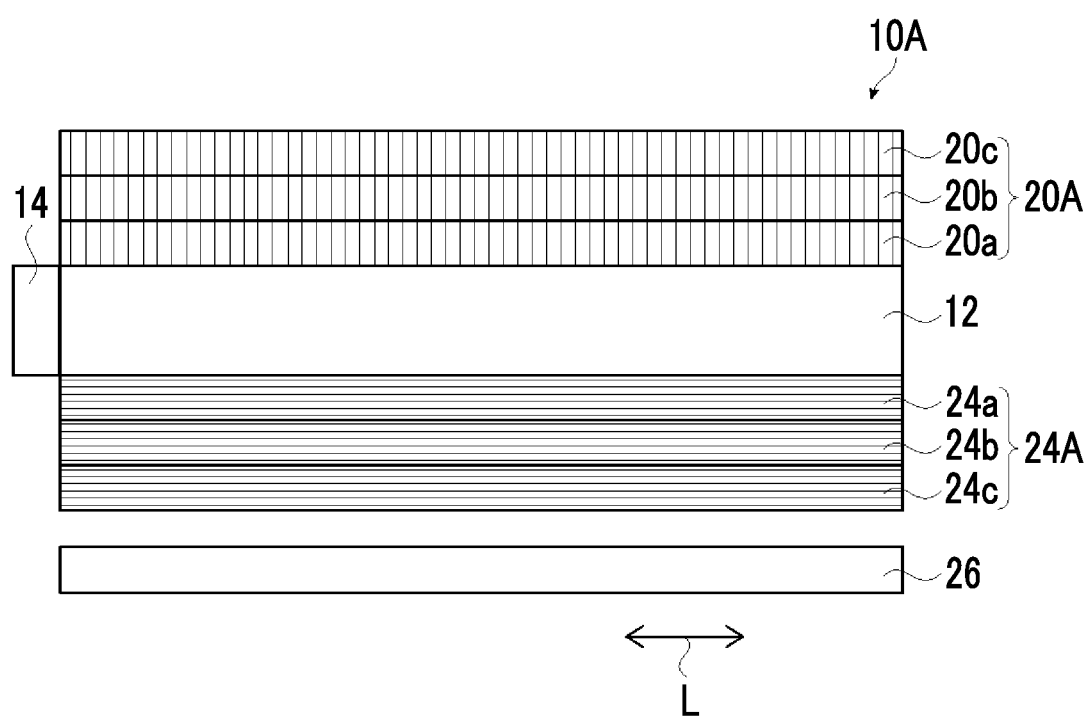
FIG. 12 is a diagram conceptually showing another example of the backlight unit according to the embodiment of the present invention.

For example, as in a backlight unit 10A conceptually shown in FIG. 12 showing the cross-section taken along the center line a in FIG. 1, a first diffraction element 20A may include three diffraction elements including a diffraction element 20a, a diffraction element 20b, and a diffraction element 20c, and a second diffraction element 24A may include three diffraction elements including a diffraction element 20a, a diffraction element 20b, and a diffraction element 20c.

Alternatively, in the example shown in FIG. 12, the first diffraction element 20A may include two diffraction elements including the diffraction element 20a and the diffraction element 20b, and the second diffraction element 24A may include two diffraction elements including the diffraction element 20a and the diffraction element 20b.

The number of diffraction elements in the first diffraction element and/or the second diffraction element may be optionally four or more.

In a case where the first diffraction element and/or the second diffraction element includes a plurality of diffraction elements, as conceptually shown in FIG. 12, directions of periodic structures in all the diffraction elements of the first diffraction element match each other, and directions of periodic structures in all the diffraction elements of the second diffraction element match each other.

In a case where the first diffraction element and the second diffraction element includes a plurality of diffraction elements, the number of diffraction elements in the first diffraction element and the number of diffraction elements in the second diffraction element may be different from each other but are preferably the same as each other.

That is, it is preferable that each of the first diffraction element and the second diffraction element include two diffraction elements, and it is more preferable that each of the first diffraction element and the second diffraction element include three diffraction elements.

In the configuration where the first diffraction element and/or the second diffraction element includes a plurality of diffraction elements, the reflective liquid crystal diffraction element including the cholesteric liquid crystal layer 42 is used as a diffraction element, which is particularly suitable.

In general, as the wavelength of light increases, the diffraction element diffracts the light more largely.

Therefore, in a case where each of the first diffraction element and the second diffraction element includes only one diffraction element, the degree of diffraction vanes depending on the wavelength of light, and the reflection direction or transmission of the light varies depending on the wavelength. As a result, the tint of emitted light may vary in a plane direction depending on the degree of diffraction corresponding to the wavelength.

Here, as described above, the cholesteric liquid crystal layer has wavelength selectivity in reflection.

In addition, in the cholesteric liquid crystal layer 42 having the liquid crystal alignment pattern in which the optical axis 48A derived from the liquid crystal compound 48 continuously rotates in the one in-plane direction, the degree of diffraction, that is, the reflection angle can be adjusted by adjusting the single period A.

On the other hand, in the cholesteric liquid crystal layer 42 having this liquid crystal alignment pattern, the degree of diffraction, that is, the reflection angle varies depending on the wavelength. Specifically, as the wavelength of light increases, the light is diffracted more largely, and a difference in reflection angle with respect to specular reflection increases.

Accordingly, the first diffraction element and/or the second diffraction element includes a plurality of diffraction elements including the cholesteric liquid crystal layer 42. As a result, light components having different wavelength ranges (colors) can be diffracted (reflected) by the corresponding diffraction elements. In addition, the single period A of each of the cholesteric liquid crystal layers 42 can be freely adjusted for each of the cholesteric liquid crystal layers 42 of the individual diffraction elements depending on the corresponding wavelength range.

As a result, the first diffraction element and the second diffraction element correspond light in a wide wavelength range and can appropriately reflect incident light substantially in the normal direction.

For example, in the first diffraction element 20A shown in FIG. 12, the diffraction element 20a includes the cholesteric liquid crystal layer 42 that reflects red light, the diffraction element 20b includes the cholesteric liquid crystal layer 42 that reflects green light, and the diffraction element 20c includes the cholesteric liquid crystal layer 42 that reflects blue light.

In the cholesteric liquid crystal layer 42 of the diffraction element 20a that reflects red light having the longest wavelength, the single period A is the longest. In the cholesteric liquid crystal layer 42 of the diffraction element 20b that reflects green light having the second longest wavelength, the single period A is the second longest. Further, in the cholesteric liquid crystal layer 42 of the diffraction element 20c that reflects blue light having the shortest wavelength, the single period A is the shortest.

As a result, the first diffraction element 20A can reflect all of red light, green light, and blue light substantially in the normal direction irrespective of the wavelength of incident light.

That is, in the backlight unit according to the embodiment of the present invention, the first diffraction element and/or the second diffraction element includes a plurality of diffraction elements. Thus, light in a wide wavelength range can be diffracted substantially in the normal direction irrespective of the wavelength range.

As a result, the backlight unit according to the embodiment of the present invention can prevent the tint of emitted light from varying in the plane direction and can emit light having a uniform tint in the plane direction.

In a case where the first diffraction element and/or the second diffraction element includes two diffraction elements, the period of the periodic structure of one diffraction element is preferably 440 to 480 nm and more preferably 450 to 470 nm. In addition, the period of the periodic structure of another diffraction element is preferably 480 to 520 nm and more preferably 490 to 510 nm.

In a case where the first diffraction element and/or the second diffraction element includes three diffraction elements, the period of the periodic structure of one diffraction element is preferably 380 to 420 nm and more preferably 390 to 410 nm. In addition, the period of the periodic structure of another diffraction element is preferably 460 to 520 nm and more preferably 470 to 510 nm. Further, the period of the periodic structure of another diffraction element is preferably 540 to 580 nm and more preferably 550 to 570 nm.

By adjusting the period of the periodic structure of each of the diffraction gratings to be in the above-described range, light in a wide wavelength range can be more suitably diffracted substantially in the normal direction, and the tint of emitted light can be prevented from varying in the plane direction.

As described above, in the diffraction element, in general, as the period of the periodic structure decreases, light is diffracted more largely, and as the wavelength of light increases, the light is diffracted more largely.

Accordingly, in a case where the first diffraction element and/or the second diffraction element includes a plurality of diffraction elements, it is preferable that a diffraction element in which the period of the periodic structure is short corresponds to diffraction of light having a shorter wavelength and a diffraction element in which the period of the periodic structure is long corresponds to diffraction of light having a longer wavelength. As a result, light in a wide wavelength range can be suitably diffracted substantially in the normal direction, and the tint of emitted light can be prevented from varying in the plane direction.

For example, in a case where three diffraction elements corresponding to red light, green light, and blue light are provided as in the first diffraction element 20A, it is preferable that the period of the diffraction element 20a corresponding to red light having the longest wavelength is the longest at 540 to 580 nm, the period of the diffraction element 20b corresponding to green light having the second longest wavelength is the second shortest at 460 to 520 nm, and the period of the diffraction element 20c corresponding to blue light having the shortest wavelength is the shortest at 380 to 420 nm.

That is, in the backlight unit according to the embodiment of the present invention, in a case where the first diffraction element and/or the second diffraction element includes a plurality of diffraction elements, it is preferable that a permutation of the corresponding wavelengths and a permutation of the periods of the periodic structures in the respective diffraction elements match each other.

The liquid crystal display device according to the embodiment of the present invention is a liquid crystal display device including: the above-described backlight unit according to the embodiment of the present invention; and a liquid crystal display element.

In the liquid crystal display device according to the embodiment of the present invention, the liquid crystal display element is not particularly limited. Accordingly, as the liquid crystal display element, various well-known liquid crystal display elements (liquid crystal display panels) including a liquid crystal cell, a transparent electrode, a backlight-side polarizing plate, and an emission-side polarizing plate can be used.

Hereinabove, the backlight unit and the liquid crystal display device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Alignment Film)

A glass substrate was used as the support.

The following coating liquid for forming an alignment film was applied to the support using a spin coater at 2500 rpm for 30 seconds. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

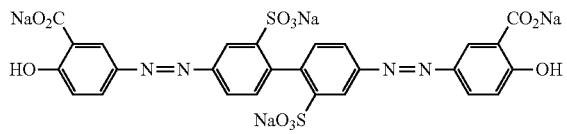

(Exposure of Alignment Film)

The alignment film was exposed using the exposure device shown in FIG. 7 to form an alignment film P-1 having an alignment pattern.

In the exposure device, a laser that emits laser light having a wavelength (325 nm) was used as the laser. The exposure dose of the interference light was 300 mJ/cm$^2$. An intersecting angle (intersecting angle α) between the two beams was adjusted to 41.4° such that the single period Λ (the length over which the optical axis rotates by 180°) of an alignment pattern formed by interference of two laser beams was 0.46 μm.

(Formation of Cholesteric Liquid Crystal Layer)

As the liquid crystal composition forming the cholesteric liquid crystal layer, the following liquid crystal composition LC-1 was prepared.

Liquid Crystal Composition LC-1

| | |
|---|---|
| Liquid crystal compound L-1 | 100.00 parts by mass |
| Polymerization initiator (IRGACURE 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-3 | 6.20 parts by mass |
| Methyl ethyl ketone | 330.60 parts by mass |

Liquid Crystal Compound L-1

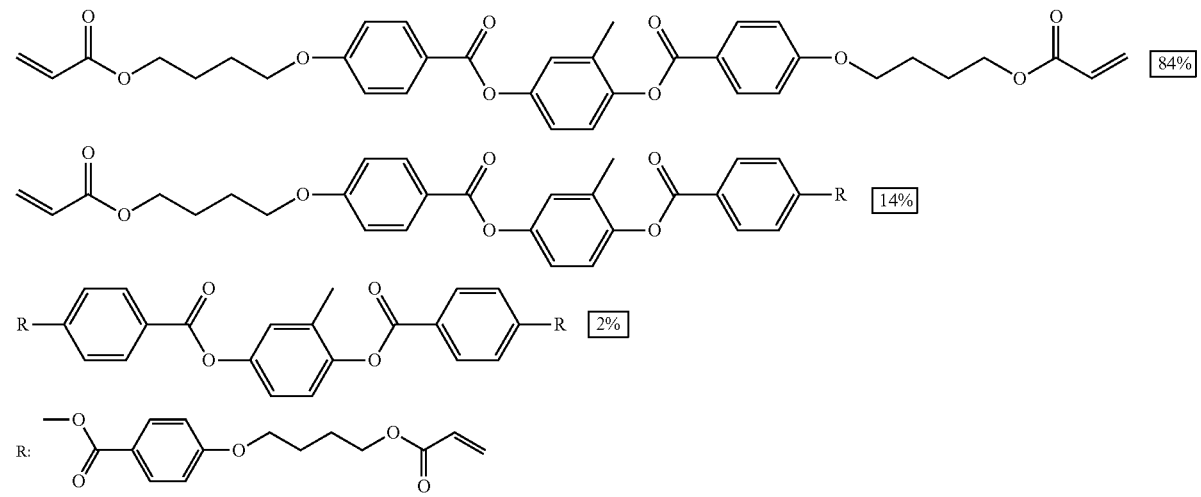

The phase transition temperature of the liquid crystal compound L-1 was obtained by heating the liquid crystal compound on a hot stage and observing the texture with a polarization microscope. As a result, the crystal-nematic phase transition temperature was 79° C., and the nematic-isotropic phase transition temperature was 144° C.

In addition, Δn of the liquid crystal compound L-1 was measured by pouring the liquid crystal compound into a wedge cell, emitting laser light having a wavelength of 550 nm, and measuring the refraction angle of the transmitted light. The measurement temperature was 60° C. Δn of the liquid crystal compound L-1 was 0.16.

Chiral Agent Ch-1

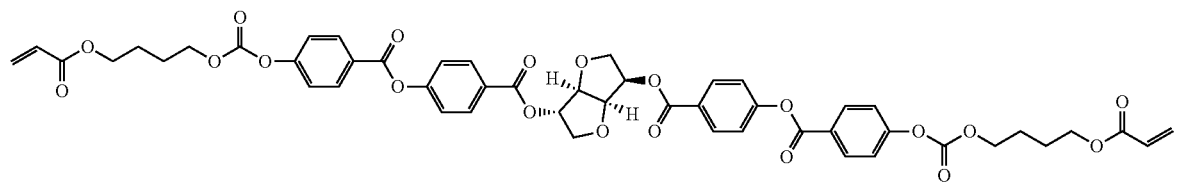 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

This chiral agent Ch-1 is a chiral agent that turns the liquid crystal compound in a right-twisted helical shape. Accordingly, the cholesteric liquid crystal layer selectively reflects right circularly polarized light.

The liquid crystal composition LC-1 was applied to the alignment film P-1 using a spin coater at 800 rpm for 10 seconds.

The coating film of the liquid crystal composition LC-1 was heated on a hot plate at 80° C. for 3 minutes (180 sec).

Next, the coating film was irradiated with ultraviolet light having a wavelength of 365 nm at 80° C. at an irradiation dose of 300 md/cm² using a high-pressure mercury lamp in a nitrogen atmosphere. As a result, the liquid crystal composition LC-1 was cured, the alignment of the liquid crystal compound was immobilized, and a cholesteric liquid crystal layer was formed.

Thus, a liquid crystal diffraction element including the support, the alignment film, and the cholesteric liquid crystal layer shown in FIG. 4 was prepared.

It was verified using a polarization microscope that the cholesteric liquid crystal layer had a periodically aligned surface as shown in FIG. 5.

The liquid crystal diffraction element was cut in a direction along the rotation direction of the optical axis, and a cross-section was observed with a SEM. By analyzing the SEM image, the single period Λ of the liquid crystal alignment pattern of the cholesteric liquid crystal layer and the length pitch P of one helical pitch were measured. The measurement results are shown in the following Table 1.

(Preparation of Laminate Including Light Guide Plate and Liquid Crystal Diffraction Element)

By bonding the cholesteric liquid crystal layer of the prepared liquid crystal diffraction element to both surfaces of a glass plate, a laminate A1 including the light guide plate and the liquid crystal diffraction element was prepared. Bonding was performed a pressure-sensitive adhesive layer (SK DINE 2057, manufactured by Soken Chemical & Engineering Co., Ltd.).

Bonding was performed such that the side of the cholesteric liquid crystal layer where the alignment film was provided was the glass surface side after peeling off the support and the alignment film. In addition, the cholesteric liquid crystal layer was disposed such that the arrow X directions of the cholesteric liquid crystal layers bonded to both surfaces of the glass were perpendicular to each other.

(Preparation of Backlight Unit)

A commercially available laptop computer (Elite Book 840 G3, manufactured by HP Development Company, L.P.) was disassembled, the light guide plate, the prism sheet, and the diffusion sheet were taken out, and the prepared laminate A1 was disposed instead of the taken out light guide plate.

During the evaluation of a narrow viewing angle mode, the laminate A1 was disposed such that the arrow X direction of the cholesteric liquid crystal layer on the visible side was perpendicular to an incidence direction of a LED light source. In addition, during the evaluation of a wide viewing angle mode, the laminate A1 was disposed such that the arrow X direction of the cholesteric liquid crystal layer on the visible side was the same as the incidence direction of the LED light source.

In addition, the diffusion sheet and the reflection plate (MIRO-SILVER 2, manufactured by ALANOD GmbH & Co. KG) that were taken out were provided in order from the opposite visible side of the light guide plate. In this example, the laminate including the diffusion sheet and the reflection plate acts as the reflection plate in FIG. 1.

(Recognition of Viewing Angle)

It was verified that an image displayed on a screen at a viewing angle of ±30° or more was not able to be recognized in the narrow viewing angle mode and that an image displayed on a screen at a viewing angle of ±60° or more was not able to be recognized in the wide viewing angle mode. It was found that, by controlling the incident surface direction of the LED light source, the viewing angle can be switched.

(Measurement of Depolarizing Degree of Reflection Plate)

Using a gonio-spectrophotometric color measurement system (GCMS-3B, manufactured by Murakami Color Research Laboratory Co., Ltd.), the depolarizing degree of the laminate including the diffusion sheet and the reflection plate was measured.

A right polarizing plate was provided before the light source. Light emitted from the light source and transmitted through the right circular polarization plate was incident into the laminate including the diffusion sheet and the reflection plate, and the brightness of reflected light by the laminate was measured by the detector. By performing the measurement of the reflected light through the right polarizing plate and through the left circular polarization plate, the brightness $Y_R$ of right circularly polarized light and the brightness $Y_L$ of left circularly polarized light in the reflected light were measured.

Based on the measured brightness values, the depolarizing degree (degree of circular polarization) was calculated.

$$\text{Depolarizing degree [\%]} = 100 \times (1 - (Y_L - Y_R)/(Y_L + Y_R))$$

As a result, the depolarizing degree of the laminate including the diffusion sheet and the reflection plate was 90%.

(Evaluation of Display Performance)

The display performance of the prepared backlight was evaluated as follows.

In the following evaluation, a commercially available product was Elite Book 840 G3 (manufactured by HP Development Company, L.P.).

<Evaluation of Change in Brightness During Change in Viewing Angle in Narrow Viewing Angle Mode>

A+: in a case where the viewing angle (image observation direction) was changed in the left-right direction, a change in brightness between the right direction and the left direction was not able to be recognized.

A: in a case where the viewing angle was changed in the left-right direction, a slight change in brightness between the right direction and the left direction was recognized.

B: in a case where the viewing angle was changed in the left-right direction, a small change in brightness between the right direction and the left direction was recognized.

B−: in a case where the viewing angle was changed in the left-right direction, a change in brightness between the right direction and the left direction was recognized.

C: in a case where the viewing angle was changed in the left-right direction, a clear change in brightness between the right direction and the left direction was recognized.

<Evaluation of Change in Brightness During Change in Viewing Angle in Wide Viewing Angle (Typical) Mode>

A+: in a case where the viewing angle was changed in the left-right direction, a change in brightness was the same as that of the commercially available product.

A: in a case where the viewing angle was changed in the left-right direction, a change in brightness was slightly darker than that of the commercially available product.

B: in a case where the viewing angle was changed in the left-right direction, a small change in brightness between the right direction and the left direction was recognized as compared to the commercially available product.

C: in a case where the viewing angle was changed in the left-right direction, a change in brightness between the right direction and the left direction was recognized as compared to the commercially available product.

<Evaluation of Tint Change during Change in Viewing Angle>

Since there was more likely to be a difference in tint change in the narrow viewing angle mode than in the wide viewing angle mode, the tint change during the change in viewing angle in the narrow viewing angle mode was evaluated.

A+: in a case where the viewing angle was changed in the left-right direction, a difference in tint change was not able to be recognized as compared to the commercially available product.

A: in a case where the viewing angle was changed in the left-right direction, a slight difference in tint change was recognized as compared to the commercially available product.

B: in a case where the viewing angle was changed in the left-right direction, a small difference in tint change was recognized as compared to the commercially available product.

B−: in a case where the viewing angle was changed in the left-right direction, a difference in tint change was recognized as compared to the commercially available product.

C: in a case where the viewing angle was changed in the left-right direction, a clear difference in tint change was recognized as compared to the commercially available product.

<Evaluation of Uniformity in In-plane Brightness>

A: A difference in in-plane brightness distribution was not able to be recognized as compared to the commercially available product.

B: a slight difference in brightness caused by an arrangement interval in the LED light source was recognized as compared to the commercially available product.

Example 2

A laminate A2 including the light guide plate and the liquid crystal diffraction element was prepared using the same method as that of Example 1, except that the intersecting angle α in the exposure device in a case where the alignment film of the liquid crystal diffraction element was exposed was 37.9° and the single period A of the cholesteric liquid crystal layer was changed.

Using this laminate A2, a backlight unit was prepared using the same method as that of Example 1 and was evaluated using the same method as that of Example 1.

Example 3

(Preparation of Liquid Crystal Layer)

A glass substrate was used as the support.

Polyimide (SE-130, manufactured by Nissan Chemical Industries Ltd.) was applied to the support, dried, and rubbed. As a result, a substrate with the alignment film was prepared.

The following coating solution for forming a liquid crystal layer was applied to the rubbed surface of the alignment film by spin coating under conditions of a rotation speed of 1000 rpm and 10 seconds, and was aged at 120° C. for 1 minute. Next, the coating solution was cured by being irradiated with ultraviolet light at 30° C. in a nitrogen atmosphere at an irradiation dose of 500 mJ/cm². As a result, a liquid crystal layer was obtained.

Coating Solution for forming Liquid Crystal Layer

| | |
|---|---|
| Disk-shaped liquid crystal compound D-1 | 100 parts by mass |
| Polymerization initiator (IRGACURE 907, manufactured by BASF SE) | 3.0 parts by mass |
| Surfactant S-1 | 0.45 parts by mass |
| Solvent (MEK/cyclohexanone = 90/10 (mass ratio)) | An amount in which the solute concentration was 30% by mass |
| (MEK represents methyl ethyl ketone) | |

(Disk-Shaped Liquid Crystal Compound D-1)

As the disk-shaped liquid crystal compound, the following disk-shaped liquid crystal compound D-1 described in JP2007-131765A was used.

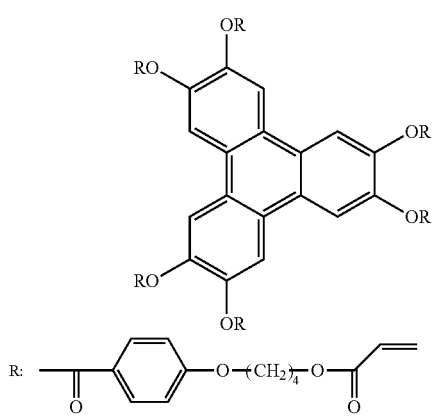

D-1

(Synthesis of Surfactant S-1)

2.5 g of FAAC-6 (manufactured by UNIMATEC Chemicals Co., Ltd.) and 2.5 g of acrylic acid (manufactured by Wako Pure Chemical Industries. Ltd.) were polymerized using a radical polymerization method to obtain a surfactant S-1.

(Preparation of Cholesteric Liquid Crystal Layer)

The following liquid crystal composition LC-2 was applied to the prepared liquid crystal layer by spin coating under conditions of a rotation speed of 1500 rpm and 10 seconds to form a composition layer. Next, the layer of the liquid crystal composition LC-2 was aged at 90° C. for 1 minute.

Next, the aged liquid crystal composition was irradiated with ultraviolet light of 365 nm at 30° C. using a light source (2 UV transilluminator, manufactured by UVP Inc.) at an irradiation intensity of 2 mW/cm² for 60 seconds. Next, the coating film was irradiated with ultraviolet light at 30° C. in a nitrogen atmosphere at an irradiation dose of 500 mJ/cm2 to cause a polymerization reaction of the liquid crystal compound to occur. As a result, the cholesteric liquid crystal layer in which the cholesterically aligned state was immobilized was obtained.

Through the above-described steps, the liquid crystal diffraction element shown in FIG. 8 was prepared, the liquid crystal diffraction element including: the liquid crystal layer; and the cholesteric liquid crystal layer disposed on the liquid crystal layer.

| Liquid Crystal Composition LC-2 | |
|---|---|
| Liquid crystal compound LC-1 | 100 parts by mass |
| Surfactant S-2 | 0.1 parts by mass |
| Compound CD-1 | 5.5 parts by mass |
| Compound CD-2 | 5.5 parts by mass |
| Polymerization initiator (IRGACURE 907, manufactured by BASF SE) | 3.0 parts by mass |
| Solvent (MEK/cyclohexarione = 90/10 (mass ratio)) | |
| An amount in which the solute concentration was 30% by mass | |

Liquid Crystal Compound LC-1

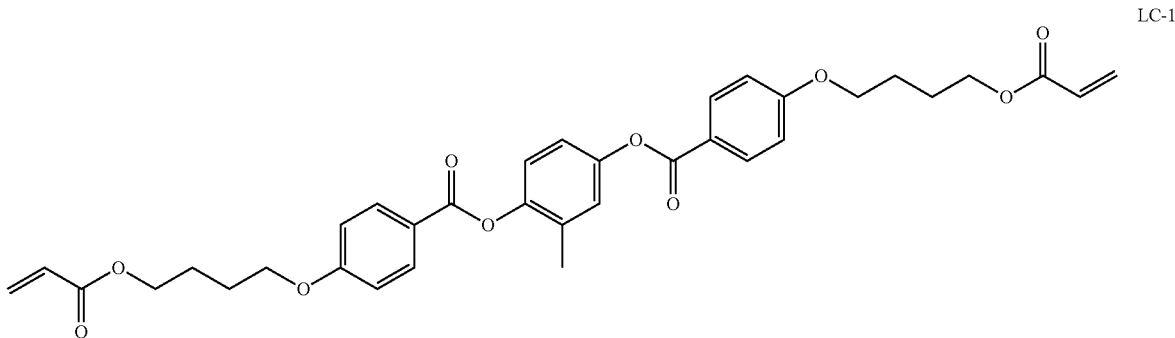 [SMILES: C=CC(=O)OCCCCOc1ccc(C(=O)Oc2ccc(OC(=O)c3ccc(OCCCCOC(=O)C=C)cc3)c(C)c2)cc1]

Surfactant S-2

The surfactant S-2 is a compound described in JP5774518B and has the following structure.

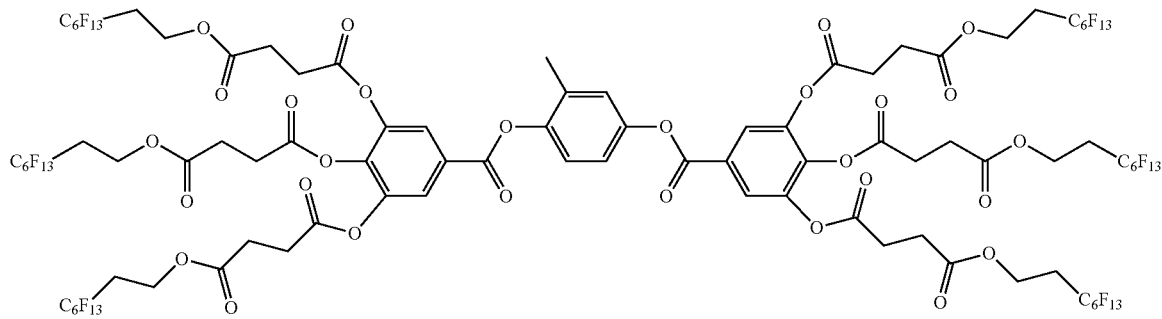

<Chiral Agent>
(Synthesis of Compound CD-1)

According to the following synthesis procedure, the compound CD-1 was synthesized using a general method.

The compound CD-1 is a chiral agent in which the helix direction is left and the HTP does not change due to a temperature change or light irradiation.

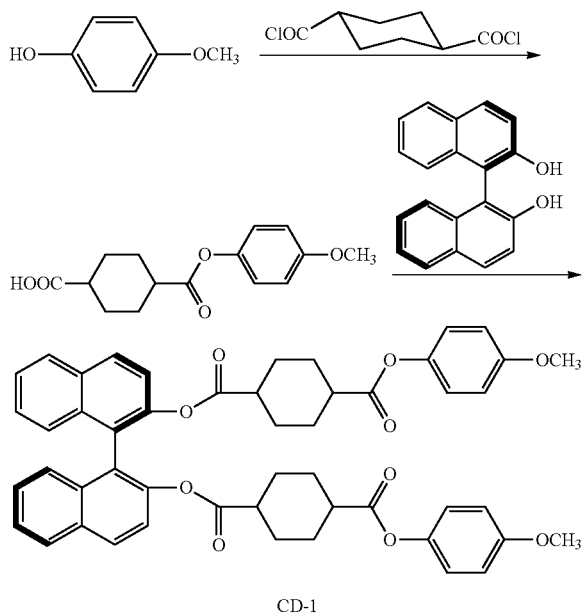

CD-1

(Synthesis of Compound CD-2)

The compound CD-2 was synthesized according to JP2002-338575A.

The compound CD-2 is a chiral agent in which the helical direction is right and the helical twisting power changes due to a temperature change or light irradiation.

By bonding the cholesteric liquid crystal layer of the prepared liquid crystal diffraction element to both surfaces of a glass plate, a laminate A3 including the light guide plate and the liquid crystal diffraction element was prepared. Bonding was performed a pressure-sensitive adhesive layer (SK DINE 2057, manufactured by Soken Chemical & Engineering Co., Ltd.).

Bonding was performed such that the side of the cholesteric liquid crystal layer where the liquid crystal layer was provided was the glass surface side after peeling off the liquid crystal layer. In addition, the cholesteric liquid crystal layer was disposed such that the arrow X directions of the liquid crystal layers bonded to both surfaces of the glass were perpendicular to each other.

Using this laminate A3, a backlight unit was prepared using the same method as that of Example 1 and was evaluated using the same method as that of Example 1.

[Comparative Example 1]

A liquid crystal diffraction element was prepared using the same method as that of Example 1, except that the intersecting angle α in the exposure device in a case where the alignment film of the liquid crystal diffraction element was exposed was 39.6° and the single period A of the cholesteric liquid crystal layer was changed.

By bonding the cholesteric liquid crystal layer of the prepared liquid crystal diffraction element to a single surface of a glass plate, a laminate B1 including the light guide plate and the liquid crystal diffraction element was prepared. Bonding was performed a pressure-sensitive adhesive layer (SK DINE 2057, manufactured by Soken Chemical & Engineering Co., Ltd.).

Bonding was performed such that the side of the cholesteric liquid crystal layer where the alignment film was provided was the glass surface side after peeling off the support and the alignment film.

A commercially available laptop computer (Elite Book 840 G3, manufactured by HP Development Company, L.P.) was disassembled, the light guide plate, the prism sheet, and the diffusion sheet were taken out, and the prepared laminate B1 was disposed instead of the light guide plate. Using this laminate B1, a backlight unit was prepared using the same method as that of Example 1 and was evaluated using the same method as that of Example 1.

During the evaluation of a narrow viewing angle mode, the laminate B1 was disposed such that the arrow X direction of the cholesteric liquid crystal layer on the visible side was opposite to an incidence direction of a LED light source. In addition, during the evaluation of a wide viewing angle mode, the laminate B1 was disposed such that the arrow X direction of the cholesteric liquid crystal layer on the visible side was the same as the incidence direction of the LED light source.

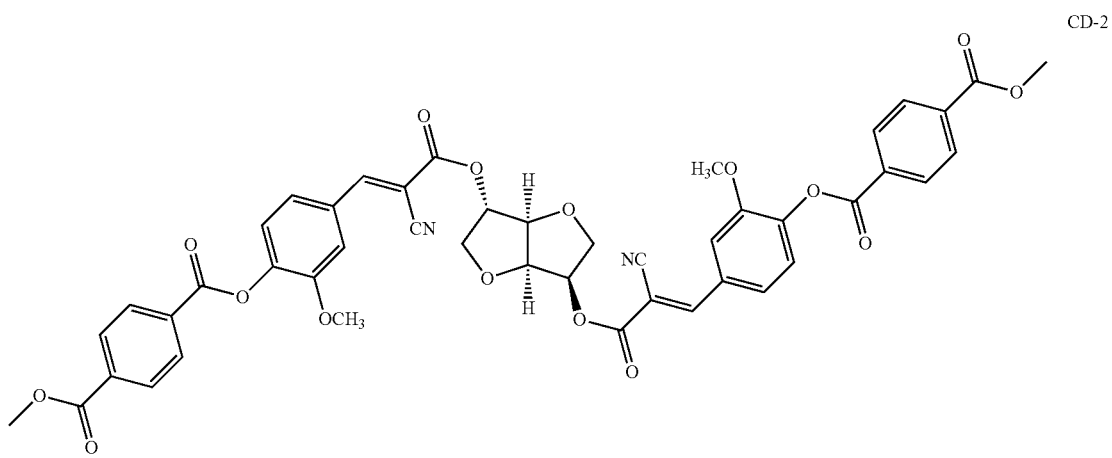

CD-2

Examples 4 and 5

A laminate A4 (Example 4) including the light guide plate and the liquid crystal diffraction element and a laminate A5 (Example 5) including the light guide plate and the liquid crystal diffraction element were prepared using the same method as that of Example 1, except that the intersecting angles α in the exposure device in a case where the alignment film of the liquid crystal diffraction element was exposed were 45.6° (Example 4) and 35.1° (Example 5) and the single period A of the cholesteric liquid crystal layer was changed.

Using each of the laminates, a backlight unit was prepared using the same method as that of Example 1 and was evaluated using the same method as that of Example 1.

Example 6

The first liquid crystal diffraction element was prepared using the same method as that of the liquid crystal diffraction element according to Example 1, except that the addition amount of the chiral agent Ch-1 during the formation of the cholesteric liquid crystal layer was changed to 4.4 parts by mass and the length pitch P of one helical pitch was changed.

The second liquid crystal diffraction element was prepared using the same method as that of Example 1, except that the addition amount of the chiral agent Ch-1 during the formation of the cholesteric liquid crystal layer was changed to 3.7 parts by mass, the length pitch P of one helical pitch was changed, the intersecting angle α in the exposure device in a case where the alignment film of the liquid crystal diffraction element was exposed was 37.9°, and the single period A of the cholesteric liquid crystal layer was changed.

The cholesteric liquid crystal layer of the prepared first liquid crystal diffraction element was bonded to both surfaces of the glass plate. Bonding was performed a pressure-sensitive adhesive layer (SK DINE 2057, manufactured by Soken Chemical & Engineering Co., Ltd.).

Bonding was performed such that the side of the cholesteric liquid crystal layer where the alignment film was provided was the glass surface side after peeling off the support and the alignment film. In addition, the cholesteric liquid crystal layer was disposed such that the arrow X directions of the cholesteric liquid crystal layers bonded to both surfaces of the glass were perpendicular to each other.

Further, Using the same method as described above, the cholesteric liquid crystal layer of the second liquid crystal diffraction element was bonded to the first cholesteric liquid crystal layer such that the arrow X directions matched each other. As a result, a laminate A6 including the light guide plate and the liquid crystal diffraction element was prepared.

Using this laminate A6, a backlight unit was prepared using the same method as that of Example 1 and was evaluated using the same method as that of Example 1.

Example 7

The first liquid crystal diffraction element was prepared using the same method as that of the liquid crystal diffraction element according to Example 1, except that the addition amount of the chiral agent Ch-1 during the formation of the cholesteric liquid crystal layer was changed to 4.9 parts by mass, the length pitch P of one helical pitch was changed, the intersecting angle α in the exposure device in a case where the alignment film of the liquid crystal diffraction element was exposed was 48.0°, and the single period A of the cholesteric liquid crystal layer was changed.

The second liquid crystal diffraction element was prepared using the same method as that of the liquid crystal diffraction element according to Example 1, except that the addition amount of the chiral agent Ch-1 during the formation of the cholesteric liquid crystal layer was changed to 4.0 parts by mass, the length pitch P of one helical pitch was changed, the intersecting angle α in the exposure device in a case where the alignment film of the liquid crystal diffraction element was exposed was 39.60, and the single period A of the cholesteric liquid crystal layer was changed.

Further, the third liquid crystal diffraction element was prepared using the same method as that of the liquid crystal diffraction element according to Example 1, except that the addition amount of the chiral agent Ch-1 during the formation of the cholesteric liquid crystal layer was changed to 3.4 parts by mass, the length pitch P of one helical pitch was changed, the intersecting angle α in the exposure device in a case where the alignment film of the liquid crystal diffraction element was exposed was 33.7°, and the single period A of the cholesteric liquid crystal layer was changed.

The cholesteric liquid crystal laver of the prepared first liquid crystal diffraction element was bonded to both surfaces of the glass plate. Bonding was performed a pressure-sensitive adhesive layer (SK DINE 2057, manufactured by Soken Chemical & Engineering Co., Ltd.).

Bonding was performed such that the side of the cholesteric liquid crystal layer where the alignment film was provided was the glass surface side after peeling off the support and the alignment film. In addition, the cholesteric liquid crystal layer was disposed such that the arrow X directions of the cholesteric liquid crystal layers bonded to both surfaces of the glass were perpendicular to each other.

Using the same method as described above, the cholesteric liquid crystal layer of the second liquid crystal diffraction element was bonded to the first cholesteric liquid crystal layer such that the arrow X directions matched each other.

Further, using the same method as described above, the cholesteric liquid crystal layer of the third liquid crystal diffraction element was bonded to the second cholesteric liquid crystal layer such that the arrow X directions matched each other. As a result, a laminate A7 including the light guide plate and the liquid crystal diffraction element was prepared.

Using this laminate A7, a backlight unit was prepared using the same method as that of Example 1 and was evaluated using the same method as that of Example 1.

Example 8

(Preparation of Reflection Plate)

A diffuse reflection plate was prepared using the same method as that of Example 3 of JP2002-250803A, except that a part of fine particles to be used was changed to silicone fine particles (TOSPEARL 120, manufactured by Momentive Performance Materials Inc.).

Using the above-described method, the depolarizing degree of the diffuse reflection plate was measured. As a result, the depolarizing degree of the circular polarization reflection plate was 20%.

A backlight unit was prepared using the same method as that of Example 1 and was evaluated using the same method as that of Example 1, except that the prepared diffuse reflection plate was used instead of the laminate including the diffusion sheet and the reflection plate and the laminate A7 including the light guide plate and the liquid crystal diffraction element prepared in Example 7 was used.

Example 9

A commercially available television (LG 32LF6300, manufactured by LG Electronics Co. Ltd.) was disassembled, and the diffusion plate was taken out and was cut in an appropriate size.

A backlight unit was prepared using the same method as that of Example 8 and was evaluated using the same method as that of Example 1, except that the cut diffusion plate was disposed between the LED light source and the light guide plate.

The above results are shown in Table 1.

right direction and the image observed from the left direction was small, and a change in tint was also small. In addition, the in-plane brightness uniformity was also high. In particular, as shown in Example 1 and Examples 4 and 5, by adjusting the single periods of the first diffraction element and the second diffraction element to be 440 to 520 nm (0.44 to 0.52 μm), a change in brightness and tint between an image observed from the right direction and the image observed from the left direction can be further reduced.

In addition, as shown in Examples 6 and 7, in a case where the first diffraction element and the second diffraction element includes a plurality of diffraction elements, a change in brightness and a change in tint can be further reduced.

Further, as shown in Example 8, by reducing the depolarizing degree of the reflection plate provided on the rear

TABLE 1

| | | | Example 1 | Example 2 | Example 3 | Comparative Example 1 | Example 4 | Example 5 | Example 6 | Example 7 | Example 8 | Example 9 |
|---|---|---|---|---|---|---|---|---|---|---|---|---|
| Intersecting Angle α during Interference Exposure of Alignment Film | | First Layer | 41.4° | 37.9° | — | 39.6° | 45.6° | 35.1° | 41.4° | 48.0° | 48.0° | 48.0° |
| | | Second Layer | — | — | — | — | — | — | 37.9° | 39.6° | 39.6° | 39.6° |
| | | Third Layer | — | — | — | — | — | — | — | 33.7° | 33.7° | 33.7° |
| Cholesteric Liquid Crystal Layer | Content of Chiral Material [Part(s) by Mass] | First Layer | 4.0 | 4.0 | 5.5/5.5 | 4.0 | 4.0 | 4.0 | 4.4 | 4.9 | 4.9 | 4.9 |
| | | Second Layer | — | — | — | — | — | — | 3.7 | 4.0 | 4.0 | 4.0 |
| | | Third Layer | — | — | — | — | — | — | — | 3.4 | 3.4 | 3.4 |
| | Single Period Λ [μm] | First Layer | 0.46 | 0.5 | 0.48 | 0.48 | 0.42 | 0.54 | 0.46 | 0.4 | 0.4 | 0.4 |
| | | Second Layer | — | — | — | — | — | — | 0.5 | 0.48 | 0.48 | 0.48 |
| | | Third Layer | — | — | — | — | — | — | — | 0.56 | 0.56 | 0.56 |
| | Pitch P [μm] | First Layer | 0.41 | 0.39 | 0.42 | 0.40 | 0.41 | 0.41 | 0.38 | 0.34 | 0.34 | 0.34 |
| | | Second Layer | — | — | — | — | — | — | 0.44 | 0.41 | 0.43 | 0.41 |
| | | Third Layer | — | — | — | — | — | — | — | 0.48 | 0.48 | 0.48 |
| Kind of Evaluation | | | A1 | A2 | A3 | B1 | A4 | A5 | A6 | A7 | A7 | A7 |
| Disposition Position of Diffraction Grating | | | Both Surfaces | Both Surfaces | Both Surfaces | Single Surface | Both Surfaces | Both Surfaces | Both Surfaces | Both Surfaces | Both Surfaces | Both Surfaces |
| Number of Diffraction Gratings on Single Surface | | | 1 | 1 | 1 | 1 | 1 | 1 | 2 | 3 | 3 | 3 |
| Degree of Circular Depolarization in Reflector | | | 90% | 90% | 90% | 90% | 90% | 90% | 90% | 90% | 20% | 20% |
| Diffusion Plate before Light Source | | | None | None | None | None | None | None | None | None | None | None |
| Evaluation | Evaluation of Change in Brightness | Narrow Viewing Angle | B | B | B | C | B⁻ | B⁻ | A | A⁺ | A⁺ | A⁺ |
| | | Wide Viewing Angle | A | A | A | B | B | B | A | A | A⁺ | A⁺ |
| | Change in Tint during Change in Viewing Angle | | B | B | B | C | B⁻ | B⁻ | A | A⁺ | A⁺ | A⁺ |
| | In-Plane Brightness Uniformity | | B | B | B | B | B | B | B | B | B | A |

The alignment film was prepared using tilted disk-shaped crystal only in Example 3 and was prepared by interference in all of Examples other than Example 3
The first layer, the second layer, and the third layer represent the positions from the light guide plate (glass plate)

As shown in Table 1, in the backlight unit according to the embodiment of the present invention including the first diffraction element and the second diffraction element, a change in brightness between an image observed from the surface side of the light guide plate, in the wide viewing angle mode, the brightness uniformity between an image observed from the right direction and the image observed from the left direction can be further improved.

Further, as shown in Example 9, by providing the diffusion layer between the light source and the light guide plate, the in-plane brightness uniformity can be further improved.

On the other hand, in Comparative Example 1 where the diffraction element was provided only one surface of the light guide plate (glass plate), a change in brightness and tint between an image observed from the right direction and the image observed from the left direction was large, and the in-plane brightness uniformity was also low.

As can be seen from the above results, the effects of the present invention are obvious.

The present invention is suitably applicable to a planar lighting device such as a backlight unit of a liquid crystal display device.

EXPLANATION OF REFERENCES

10: backlight unit
12: light guide plate
14: first light source
16: second light source
20, 20A: first diffraction element
20a, 20A, 40c, 24a, 24A, 44c: diffraction element
24, 24A: second diffraction element
26: reflection plate
28: diffusion layer
36, 80, 90: liquid crystal diffraction element
38: support
40: alignment film
42, 84: cholesteric liquid crystal layer
48: liquid crystal compound
48A: optical axis
50: disk-shaped liquid crystal compound
60: exposure device
62: laser
64: light source
65: λ/2 plate
68: polarization beam splitter
70a, 70B: mirror
72A, 72B: λ/4 plate
82: liquid crystal layer
82a: tilt alignment surface
84a: main surface
92: patterned liquid crystal layer
R: right circularly polarized light
M: laser light
MA, MB: beam
$P_O$: linearly polarized light
$P_R$: right circularly polarized light
$P_L$: left circularly polarized light
Q, Q1, Q2: absolute phase
E, E1, E2: equiphase surface
$L_1$, $L_4$: incidence light
$L_2$, $L_5$: transmitted light

What is claimed is:

1. A backlight unit comprising:
a light guide plate that has first and second long side surfaces and first and second short side surfaces;
a first light source that emits light such that the light is incident into the light guide plate from at least one of the first and second short side surfaces of the light guide plate;
a second light source that emits light such that the light is incident into the light guide plate from at least one of the first and second long side surfaces of the light guide plate;
a first diffraction element that is provided on one main surface of the light guide plate and diffracts only light emitted from the first light source;
a second diffraction element that is provided on another main surface of the light guide plate opposite to the first diffraction element and diffracts only light emitted from the second light source; and
a reflection plate that is provided on a main surface of the light guide plate opposite to a light emission surface.

2. The backlight unit according to claim 1,
wherein periods of periodic structures of the first diffraction element and the second diffraction element are 440 to 520 nm.

3. The backlight unit according to claim 2,
wherein at least one of the first diffraction element or the second diffraction element is a liquid crystal diffraction element including an optically-anisotropic layer that is formed of a composition including a liquid crystal compound, and
the optically-anisotropic layer has a liquid crystal alignment pattern in which a direction of an optical axis derived from the liquid crystal compound changes while continuously rotating in one in-plane direction.

4. The backlight unit according to claim 3,
wherein the optically-anisotropic layer is a cholesteric liquid crystal layer obtained by immobilizing a cholesteric liquid crystalline phase.

5. The backlight unit according to claim 2,
wherein at least one of the first diffraction element or the second diffraction element includes two or three diffraction elements.

6. The backlight unit according to claim 5,
wherein at least one of the first diffraction element or the second diffraction element includes two diffraction elements,
a period of a periodic structure of one diffraction element is 440 to 480 nm, and
a period of a periodic structure of another diffraction element is 480 to 520 nm.

7. The backlight unit according to claim 5,
wherein at least one of the first diffraction element or the second diffraction element includes three diffraction elements,
a period of a periodic structure of one diffraction element is 380 to 420 nm,
a period of a periodic structure of another diffraction element is 460 to 520 nm, and
a period of a periodic structure of still another diffraction element is 540 to 580 nm.

8. The backlight unit according to claim 2,
wherein a depolarizing degree of reflected light by the reflection plate with respect to incidence light is 30% or less.

9. The backlight unit according to claim 2, further comprising:
a diffusion layer that is provided at least either between the first light source and the light guide plate or between the second light source and the light guide plate.

10. A liquid crystal display device comprising:
the backlight unit according to claim 2; and
a liquid crystal display element.

11. The backlight unit according to claim 1,
wherein at least one of the first diffraction element or the second diffraction element is a liquid crystal diffraction element including an optically-anisotropic layer that is formed of a composition including a liquid crystal compound, and the optically-anisotropic layer has a liquid crystal alignment pattern in which a direction of an optical axis derived from the liquid crystal compound changes while continuously rotating in one in-plane direction.

12. The backlight unit according to claim 11,
wherein the optically-anisotropic layer is a cholesteric liquid crystal layer obtained by immobilizing a cholesteric liquid crystalline phase.

13. The backlight unit according to claim 11,
wherein at least one of the first diffraction element or the second diffraction element includes two or three diffraction elements.

14. The backlight unit according to claim 13,
wherein at least one of the first diffraction element or the second diffraction element includes two diffraction elements,
a period of a periodic structure of one diffraction element is 440 to 480 nm, and
a period of a periodic structure of another diffraction element is 480 to 520 nm.

15. The backlight unit according to claim 1,
wherein at least one of the first diffraction element or the second diffraction element includes two or three diffraction elements.

16. The backlight unit according to claim 15,
wherein at least one of the first diffraction element or the second diffraction element includes two diffraction elements,
a period of a periodic structure of one diffraction element is 440 to 480 nm, and
a period of a periodic structure of another diffraction element is 480 to 520 nm.

17. The backlight unit according to claim 15,
wherein at least one of the first diffraction element or the second diffraction element includes three diffraction elements,
a period of a periodic structure of one diffraction element is 380 to 420 nm,
a period of a periodic structure of another diffraction element is 460 to 520 nm, and
a period of a periodic structure of still another diffraction element is 540 to 580 nm.

18. The backlight unit according to claim 1,
wherein a depolarizing degree of reflected light by the reflection plate with respect to incidence light is 30% or less.

19. The backlight unit according to claim 1, further comprising:
a diffusion layer that is provided at least either between the first light source and the light guide plate or between the second light source and the light guide plate.

20. A liquid crystal display device comprising:
the backlight unit according to claim 1; and
a liquid crystal display element.

* * * * *